(12) United States Patent
Suri

(10) Patent No.: US 6,785,409 B1
(45) Date of Patent: Aug. 31, 2004

(54) SEGMENTATION METHOD AND APPARATUS FOR MEDICAL IMAGES USING DIFFUSION PROPAGATION, PIXEL CLASSIFICATION, AND MATHEMATICAL MORPHOLOGY

(75) Inventor: Jasjit S. Suri, Mayfield Heights, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 711 days.

(21) Appl. No.: 09/695,667

(22) Filed: Oct. 24, 2000

(51) Int. Cl.[7] ............................................... G06K 9/00
(52) U.S. Cl. ..................... 382/128; 382/173; 382/199; 382/256; 382/266; 382/219; 382/203; 382/106; 382/255; 382/308; 382/228; 382/288; 382/305; 345/723
(58) Field of Search .............................. 382/128, 130, 382/255, 308, 305, 131, 228, 132, 173, 170, 171, 194, 199, 203, 221, 224, 232, 242, 243, 266, 267, 238, 219, 106, 288; 128/922; 250/455; 345/723; 356/39; 377/10; 600/407, 425

(56) References Cited

U.S. PATENT DOCUMENTS

| | | | |
|---|---|---|---|
| 4,731,863 A | | 3/1988 | Sezan et al. |
| 4,952,805 A | | 8/1990 | Tanaka |
| 5,164,993 A | | 11/1992 | Capozzi et al. |
| 5,457,754 A | | 10/1995 | Han et al. |
| 5,605,155 A | | 2/1997 | Chalana et al. |
| 5,682,886 A | * | 11/1997 | Delp et al. ................... 600/407 |
| 5,768,413 A | * | 6/1998 | Levin et al. ................. 382/173 |
| 5,978,510 A | * | 11/1999 | Chung et al. ............... 382/238 |
| 6,018,499 A | | 1/2000 | Sethian et al. |
| 6,021,221 A | * | 2/2000 | Takaha ......................... 382/199 |
| 6,055,337 A | * | 4/2000 | Kim ............................ 382/242 |
| 6,138,045 A | * | 10/2000 | Kupinski et al. ............ 600/425 |
| 6,201,988 B1 | * | 3/2001 | Bourland et al. ............ 600/427 |
| 6,282,307 B1 | * | 8/2001 | Armato, III et al. ......... 382/132 |
| 6,424,732 B1 | * | 7/2002 | Shiffman et al. ............ 382/131 |
| 6,430,430 B1 | * | 8/2002 | Gosche ........................ 600/410 |

OTHER PUBLICATIONS

Effect of Edge Detection, Pixel Classification, and Classification–Edge Fusion Over LV Calibration: A Two Stage Automatic System; by Jasjit S. Suri, et al., Intelligent Systems Laboratory, Cardiovascular Research & Training Center, University of Washington, Seattle, WA (1997).

Non–Rigid Motion Models for Tracking the Left–Ventricular Wall; by A.A. Amini, et al., Department of Diagnostic Radiology, Electrical Engineering, and Computer Science, Yale University, New Haven, CT (1992).

(List continued on next page.)

*Primary Examiner*—Bhavesh M. Mehta
*Assistant Examiner*—Barry Choobin
(74) *Attorney, Agent, or Firm*—Fay, Sharpe, Fagan, Minnich & McKee, LLP

(57) ABSTRACT

A method of digital imaging includes receiving image data and fitting a curve to boundaries within the image data. The curve is fit to the boundaries within the image data by extracting a region of interest from the image data and computing a signed distance transform in a narrow band within the region of interest. Finite difference equations including various variables are solved to determine a rate at which the distance transform changes. The distance transform is then diffused at that rate. The technique is based on region-based diffusion propagation, pixel classification, and mathematical morphology. The method is implemented to run in the narrow band of the region of interest specified by the user and the computations are implemented using a fast marching method in the narrow band. While idealized for distinguishing segments of white matter, gray matter, and cerebral spinal fluid in the brain, the algorithm can applied to find contours in any digital image.

22 Claims, 18 Drawing Sheets

OTHER PUBLICATIONS

Modelling Elasticity in Solids Using Active Cubes—Application to Simulated Operations; by Morten Bro–Nielsen, INRIA Epidaure group, 2004, route des Lucioles, Institute of Mathematical Modelling Technical University of Denmark, Denmark (1991).

Automatic Left Ventricular Feature Extraction and Visualization From Echocardiographic Images; by S.K. Setarehdan and J.J. Soraghan, Signal Processing Division, Department of Electronic and Electrical Engineering, University of Strathclyde, Glasgow, U.K. (1996).

Chapter 7 Processing of Medical Image Sequences; by W. Spiesberger and M. Tasto (1981).

Frontiers of Pattern Recognition; Boundary Detection of Radiographic Images by a Threshold Method, by C.K. Chow and T. Kaneko, IBM Thomas J. Watson Research Center, Yorktown Heights, NY (Aug., 1972).

A Methodology for Evaluation of Image Segmentation Algorithms on Medical Images; by Vikram Chalana and Yongmin Kim, Image Computing Systems Laboratory, Center for Bioengineering and Department of Electrical Engineering, University of Washington, Seattle, WA (Jun., 1996).

A Fast Active Contour Algorithm; by Williams and Shah (1992).

3–D Heart Contour Delineation and Motion Estimation of Ultrasound Images Using continuous Distance Transform Neural Networks; by Yen–Hao Tseng, et al., Information Processing Laboratory, Div. of Cardiology, University of Washington School of Medicine, Seattle, WA (Oct., 1997).

IEEE Transactions on Systems, Man, and Cybernetics, vol. SMC–8, No. 8, Aug. 1978; Threshold Evaluation Techniques, by Joan S. Weszka and Azriel Rosenfeld.

IEEE Transactions on Systems, Man, and Cybernetics, vol. SMC–9, No. 1, Jan. 1979; A Threshold Selection Method from Gray–Level Histograms, by Nobuyuki Otsu.

Computers and Biomedical Research 13, 522–548 (1980); Determination of Left Ventricular Contours: A Probabilistic Algorithm Derived from Angiographic Images, by William A. Barrett, et al., Department of Medical Biophysics and Computing, University of Utah, Salt Lake City, UT.

IEEE Transactions on Biomedical Engineering, vol. BME–27, No. 6, Jun. 1980; Kinematics of the Beating Heart, by George D. Meier, et al.

The Americal Journal of Cardiology, vol. 48, Sep. 1981; Digital Image Processing of Two Dimensional Echocardiograms: Identification of the Endocardium, by David J. Skorton, MD, et al.

IEEE Transactions on Pattern Analysis and Machine Intelligence, vol. PAM1–4, No. 2, Mar. 1982; Implementation, Interpretation, and Analysis of a Suboptimal Boundary Finding Algorithm, by Howard Elliott, et al.

The Americal Journal of Cardiology, vol. 52, Aug. 1983; Atutomatic Computer Processing of Digital 2–Dimensional Echocardiograms, by Andrew J. Buda, MD, et al.

The American Journal of Cardiology, vol. 53, May 1, 1984; Computer–Assisted Edge Detection in Two–Dimensional Echocardiography: Comparison with Anatomic Data, by Steve M. Collins, et al.

IEEE Transactions on Pattern Analysis and Machine Intelligence, vol. PAM1–6, No. 1, Jan. 1984; Digital Step Edges from Zero Crossing of Second Directional Derivatives, by Robert M. Haralick.

IEEE Transactions on Biomedical Engineering, vol. BME–31, No. 6, Jun. 1984; An Effective Algorithm for Extracting Serial Endocardial Borders from 2–Dimensional Echocardiograms, by Liang–Fu Zhang and Edward A. Geiser.

IEEE Transactions on Biomedical Engineering, vol. BME–32, No. 7, Jul. 1985; Estimation of Local Cardiac Wall Deformation and Regional Wall Stress from Biplane Coronary Cineangiograms, by Hee Chan Kim, et al.

Computer Graphics, vol. 20, No. 4, Aug. 1986; Free–Form Deformation of Solid Geometric Models, by Thomas W. Sederberg and Scott R. Parry, Brigham Young University, Provo, UT.

IEEE Transactions on Medical Imaging, vol. MI–6, No. 2 Jun. 1987; Analysis of Sequence of Cardiac Contours by Fourier Descriptors for Plane Closed Curves, by A. Jouan.

Medical Progress Through Technology 12 101–115; Left Ventricular Image Processing, by Shigeru Eiho, et al., Automation Research Laboratory, Kyoto University, Japan (1987).

IEEE Journal of Robotics and Automation, vol. RA–3, No. 2, Apr. 1987; Morphologic Edge Detection, by James S. J. Lee, et al.

IEEE Transactions on Biomedical Engineering, vol. BME–34, No. 5, May 1987; Computer Analysis of Heart Motion from Two–Dimensional Echocardiograms, by Guy E. Mailloux, et al.

IEEE Transactions on Medical Imaging, vol. MI–6, No. 3, Sep. 1987; Semiautomated Border Tracking of Cine Echocardiographic Ventricular Images, by Dan Adam, et al.

Journal of Computational Physics 79, 12–49; Fronts Propagating with Curvature–Dependent: Algorithms Based on Hamilton–Jacobi Formulations, by Stanley Osher, Department of Mathematics, University of California, Los Angeles, CA (1988).

IEEE Transactions on Medical Imaging, vol. 7, No. 2, Jun. 1988; Detecting Left Ventricular Endocardial and Epicardial Boundaries by Digital Two–Dimensional Echocardiography, by C. Henry Chu, et al.

Parametrically Deformable Contour Models;, by Lawrence H. Staib and James S. Duncan, Departments of Electrical Engineering and Diagnostic Radiology, Yale University, New Haven, CT (1989).

Local Myocardial Deformation Computed From Speckle Motion; by Jean Meunier, et al., Ecole Polytechnique, C.P. 6079 Station "A" and Institut de Cardiologie, Montreal, Canada (1989).

IEEE Transactions on Medical Imaging, vol. 8, No. 2, Jun. 1989; Automatic Anatomically Selective Image Enhancement in Digital Chest Radiography, by M. Ibrahim Sezan, et al.

Algorithms In C, by Robert Sedgewick, Princeton University, 1990.

Epicardial Deformation From Coronary Cinèangiograms, by Alistair Young (1991).

Detection of Moving Contours From Left–Ventricle Cineangiograms, by Paolo Grattoni, et al., Centro di Studio per la Televisione, Consiglio Nazionale delle Ricerche, Turin, Italy (1990).

SPIE VO. 1245 Biomedical Image Processing; 3–D Image Enhancement Technique for Volumetric Cardiac Images, by William E. Higgins, Pennsylvania State University, Dept. of Electrical Engineering, University Park, PA (1990).

Time–Varying Image Processing and Moving Object Recognition 2; Image Regularization for Echocardiography Digital Processing, by Claudio Lamberti, et al., Dipartimento de Elettronica, Informatica e Sistemistica, Universita di Bologna, Bologna, Italy (1990).

Pattern Recognition, vol. 23, No. 12; Context Dependent Edge Detection and Evaluation, BY Robert M. Haralick and James J. Lee, EE Dept., FT–10, University of Washington, Seattle, WA (1990).

International Journal of Computer Vision, 4 107–126); Automatic Extraction of Deformable Part Models, by Alex P. Pentland, Vision and Modeling Group, The Media Lab, Massachusetts Institute of Technology, Cambridge, MA (1990).

Constrained Deformable Superquadrics and Nonrigid Motion Tracking; by Dimitri Metaxas and Demetri Terzopoulos, Dept. of Computer Science, University of Toronto, Ontario, Canada (1991).

Computerized Vector Mappiing of Myocardial Activation; Nabil Kanaan, et al., University of Michigan, Ann Arbor, MI, (1991).

Discrete Smooth Interpolation as an Aid To Visualizing Electrical Variables in the Heart Wall; by E.V. Simpson, et al., Depts. of Medicine and Pathology and the Engineering Research Center, Duke University Medical Center, Durham, NC (1991).

SPIE, vol. 1459 Extracting Meaning From Complex Data: Processing, Display, Interaction II; Collaborative Processing to Extract Myocardium from a Sequence of Two Dimensional Echocardiograms, by Shriram Revankar, David Sher and Steven Rosenthal (1991).

An Interactive Thresholding Scheme to Extract Myocardium From A Sequence of Two Dimensional Echocardiograms, Apr. 1991; by Shriram Revankar, David Sher, Wan–Chung Wu, Department of Computer science, State University of New York at Buffalo.

Computer Graphics, vol. 25, No. 4, Jul. 1991; Geometrically Deformed Models: A Method for Extracting Closed Geometric Models from Volume Data, by James V. Miller, et al., Rensselaer Design Research Center, Rensselaer Polytechnic Institute, General Electric Company Corporate Research and Development.

Spatio–Temporal Edge Detection for 3–D Temporal Cardiac Image Analysis; by Hsiao–Kun tu and Dmitry B. Goldof, Department of Computer Science and Engieering, University of South Florida, Tampa, FL (1992).

Image and Vision Computing; Bending and Stretching Models for LV Wall Motion Analysis from Curves and Surfaces, by Amir A. Amini and James S. Duncan (1992).

Journal of Computational Physics, 98, 231–253; Crystal Growth and Dendritic Solidification, by James A. Sethian, Dept. of Mathematics, University of California, Berkeley, CA. and John Strain, Courant Institute of Mathematical Sciences, New York University, New York, NY (1992).

Maximal Detection of Myocardium in Echocardiograms for Supervised Refinement; by Shriram Revankar and David Sher, Dept. of Computer Science, State University of New York at Buffalo, NY (1992).

Constrained Contouring in Polar Coordinates; by Shriram Revankar, Webster Research Center, XEROX Corp., NY and David Sher, Dept. of Computer Science, S.U.N.Y. at Buffalo, NY (1993).

Proceedings on the Fourth International Conference on Computer Vision, Berlin, Germany; Fast Segmentation, Tracking, and Analysis of Deformable Objects, by Chahab Nastar, INRIA Rocquencourt, Le Chesnay Cedex, France and Nicholas Ayache, INRIA Sophia–Antipolis, France (1993).

SPIE, vol. 2167, Image Processing; Image Segmentation by Stochastically Relaxing Contour Fittings, by Klaus D. Toennies and Daniel Rueckert, FG Computer Graphics, Technische Universitaet Berlin, Germany (1994).

Proceedings of the IEEE Workshop on Biomedical Image Analysis, Jun. 24–25, 1994, Seattle, WA; Matching 3–D Anatomical Surfaces with Non–Rigid Deformations Using Octree–Splines, by Richard Szeliski, Digital Equipment Corporation, Cambridge Research Lab, Cambridge, MA and Stephane Lavallee, TIMC–IMAG, Faculte de Medecine de Grenoble, La Tronche, France.

IEEE, 1994; A Periodic Generalized Cylinder Model with Local Deformations for Tracking Closed Contours Exhibiting Repeating Motion—Thomas O'Donnell, et al.

Journal of Computational Physics, 1994; Curvature Flow and Entropy Conditions Applied to Grid Generation—J.A. Sethian, Dept. of Mathematics, Univ. of Calif., Berkeley, CA.

IEEE Transactions on Pattern Analysis and Machine Intelligence, vol. 16, No. 4, Apr. 1994; Modeling, Analysis, and Visualization of Left Ventricle Shape and Motion by Hierarchial Decomposition—Chang, Wen Chen, et al.

Geophysics, vol. 59, No. 4 (Apr., 1994); Finite–Difference Solution of the Eikonal Equation Using an Efficient, First–Arrival, Wavefront Tracking Scheme—Shunhua Cao and Stewart Greenhlgh.

Computerized Medical Imaging and Graphics, vol. 19, No. 1, 1995; A Dynamic Finite Element Surface Model for Segmentationn and Tracking in Multidimensional Medical Images with Application to Cardiac 4D Image Analysis—Tim McInerney and Demetri Terzopoulos, Dept. of Computer Science, Univ. of Toronto, ON, Canada.

Computer Vision and Image Understanding, vol. 61, No. 1, 1995; Active Shape Models—Their Training and Application, T.F. Cootes, et al., Dept. of Med. Biophysics, Univ. of Manchester, England.

Image and Vision Computing, vol. 13, No. 4, 1995; Medical Computer Vision, Virtual Reality and Robotics—Nicholas Ayache.

IEEE Transactions and Image Processing, vol. 4, No. 10, 1995; A Neural Network–Based Stochastic Active Contour Model (NNS–SNAKE) for Contour Finding of Distinct Features—Greg I. Chiou and Jenq–Neng Hwang.

Simens Medical Systems, (1995), Ultrasound Group; Automatic Fetal Had Measurements from Ultrasound Images—Vikram Chalana, et al., Univ. of Washington, Seattle.

18th Annual International Conference of the IEEE Engineering in Medicine and Biology Society, Amsterdam, 1996; Two Automatic Calibration Algorithms for Left Ventricle Boundary Estimation in x–ray Images; Jasjit S. Suri, et al., Dept. of Electrical Engineering, Univ. of Washington, Seattle.

Eigenshape Analysis of Left Ventricular Outlines From Contrast Ventriculograms, 1996; Paul D. Sampson, et al., Univ. of Washington, Seattle.

Medical Image Analsis, 1996; Deformable Models in Medical Image Analysis: A Survey—Tim McInerney and Demitri Terzopoulos, Dept. of Computer Science, Univ. of Toronto, Ontario Canada.

Journal of Computational Physics, 1996; A Variational Level Set Approach to Multiphase Motion—Hong–Kai Zhao, et al., Mathematics Dept., UCLA.

A Fast Marching Level Set Method for Monotonically Advancing Fronts, 1996; J.A. Sethian, Dept. of Mathematics, Univ. of California, Berkeley.

Computer Assisted Radiology and Surgery, 1997; Left Ventricular Wall Motion Tracking via Deformable Shape Loci— Gregory J. Clary, et al., Med. Image Display and Analysis Group, Univ. of NC.

Journal of Computational Physics, 1997; A Simple Level Set Method for Solving Stefan Problems—S. Chen, et al., Univ. of Pittsburgh, Univ. of California, Univ. of Michigan.

Pattern Analysis and Applications, 1999; Computer Vision, Pattern Recongition and Image Processing in Left Ventricle Segmentation: The Last 50 Years—Jasjit S. Suri, Image Guided Surgery, Marconi Medical Systems, Cleveland, OH.

* cited by examiner

SEGMENTATION METHOD AND APPARATUS FOR MEDICAL IMAGES USING DIFFUSION PROPAGATION, PIXEL CLASSIFICATION, AND MATHEMATICAL MORPHOLOGY

BACKGROUND OF THE INVENTION

The present application relates to diagnostic medical imaging. The invention finds particular application in segmenting pixel groups within a medical image for display and use in clinical diagnostics, real time image guided surgery, therapy planning, functional MRI, and the like. It finds particular application with computations which are implemented using a "fast marching method" in the "narrow band." It is to be appreciated however, that the present invention finds further application in segmenting or defining borders in any digitized image.

Many different types of medical imaging equipment exist today. The uses of, and the analysis upon many of these images continue to improve. For example, medical sciences are in the process of searching for locations within the human brain for traits like spoken language, reading, and moral reasoning. Currently, imaging techniques are the least intrusive and most favorable techniques available to study different regions within the brain. For example, the recent growth of "fMRI" is revolutionizing the research in the behavior of the brain while engaged in an activity. This branch of MRI is highly dependent upon the classification of different regions in the brain.

Another field of brain imaging is magnetoencephalography (MEG) and electroencephalography (EEG). These techniques have enabled researchers to understand brain activity better than ever before. While all of these brain imaging techniques provide a valuable tool for studying the functions of the brain, these techniques typically rely on the inconsistent application of human hands to localize particular regions or areas within the particular medical image. Moreover, frequently there is a large time lag between image acquisition and image segmentation which can delay evaluation, diagnosis, and/or research.

The present invention contemplates an improved method and apparatus which overcomes the above-referenced problems and others.

SUMMARY OF THE INVENTION

In one embodiment of the present invention, a method of digital image presentation includes receiving image data and fitting a curve to boundaries within the image data. At least the curve and the image data are registered and processed for human readable display.

In accordance with another aspect of the present invention, a method of segmenting a medical image includes determining a regional interest on the medical image and computing a propagation speed indicative of a rate at which contour changes. The method further includes computing an altered contour within the region of interest based on a previous contour and the propagation speed. A final contour is eventually extracted from the region of interest and displayed to a user.

In accordance with another aspect of the present invention, the region of interest includes a first set of pixels distinguishable from other sets of pixels in the medical image. The extracting a final contour step includes repetitively adjusting the altered contour until the altered contour substantially circumscribes the first set of pixels.

In accordance with another aspect of the present invention, particularly for cerebral images, the first set of pixels includes one of the set of white matter, gray matter, and cerebral spinal fluid.

In accordance with another aspect of the present invention, the first set of pixels includes pixels having a defines similarity to each other.

In accordance with another aspect of the present invention, the propagation includes curvature speed relating to curvature of the contour. The speed of the curve or contour propagation is controlled by the regional constant which one can change depending on the size of the medical organ or object to be segmented. If the object is large and if the capture range is large, which implies a large distance to cover, then the waiting factor is automatically adjusted.

In accordance with another aspect of the present invention, the propagation speed includes regional speed relating to the determined region of interest. This regional speed is computed using fuzzy characteristics of the regions. These fuzzy characteristics are the membership functions which tell the contribution of each pixel in each of the identified classes. The number of classes are user defined and can thus be changed to improve the accuracy of the segmentation process.

In accordance with another aspect of the present invention, the propagation speed includes gradient speed relating to gradient information of the medical image. This information is computed from the pixel classification process.

In accordance with another aspect of the present invention, the propagation speed includes fuzzy gradient shape, so called shape-based speed. The shape-based speed is computed using gradient methods from the pixel classified image or membership images. This shape-based speed is a combination of gradient and fuzzy characteristics.

In accordance with another aspect of the present invention, the method further includes computing a signed distance transform of the previous contour using a curve layering method in a band surrounding the contour.

In accordance with another aspect of the present invention, the computing assigned distance transform step includes determining an accepted set of pixels. A trial set and a far set of pixels is then tagged and distances of the trial set from the accepted set, and of the far set from the accepted set are calculated. The curve layering or fast marching of the pixels is accomplished by testing 32 variant combinations and solving Eikonal equations.

In accordance with another aspect of the present invention, the medical image is registered with the final contour and displayed. Additionally, is an ability to register images from multiple sources for the same organ or object of interest. A segmented contour can then be computed for both images and displayed.

One advantage of the present invention resides in the increased capture range of a contour within a medical image.

Another advantage of the present invention resides in the derivation of the propagation of the curve from the parametric contour deformable model by incorporation of fuzzy characteristics. Of the two classes of deformable models, parametric class and level set class, the present invention derives the level set class from the parametric deformable class which yields all the properties of the parametric class. Implementation using the level set class offers advantages of both the parametric and level set classes.

Another advantage of the present invention resides in the ability to handle cavities, concavities, convolutedness, splitting or merging of the contours as they grow.

Another advantage of the present invention resides in the ability to prevent shock formations such as first order, second order, third order and fourth order.

Another advantage of the present invention lies in the controlled speed with which the curve evolves depending on features within the image itself.

Yet another advantage of the present invention resides in ability to duplicate image contours consistently or apply similar processing to variant images.

Still further advantages will become apparent to those of ordinary skill in the art upon reading and understanding the following detailed description.

BRIEF DESCRIPTION OF THE DRAWINGS

The invention may take form in various components and arrangements of components and in various steps and arrangements of steps. The figures are only for purposes of illustrating the preferred embodiments and are not to be construed as limiting the invention.

DETAILED DESCRIPTION OF THE PREFERRED EMBODIMENTS

Figure 1:
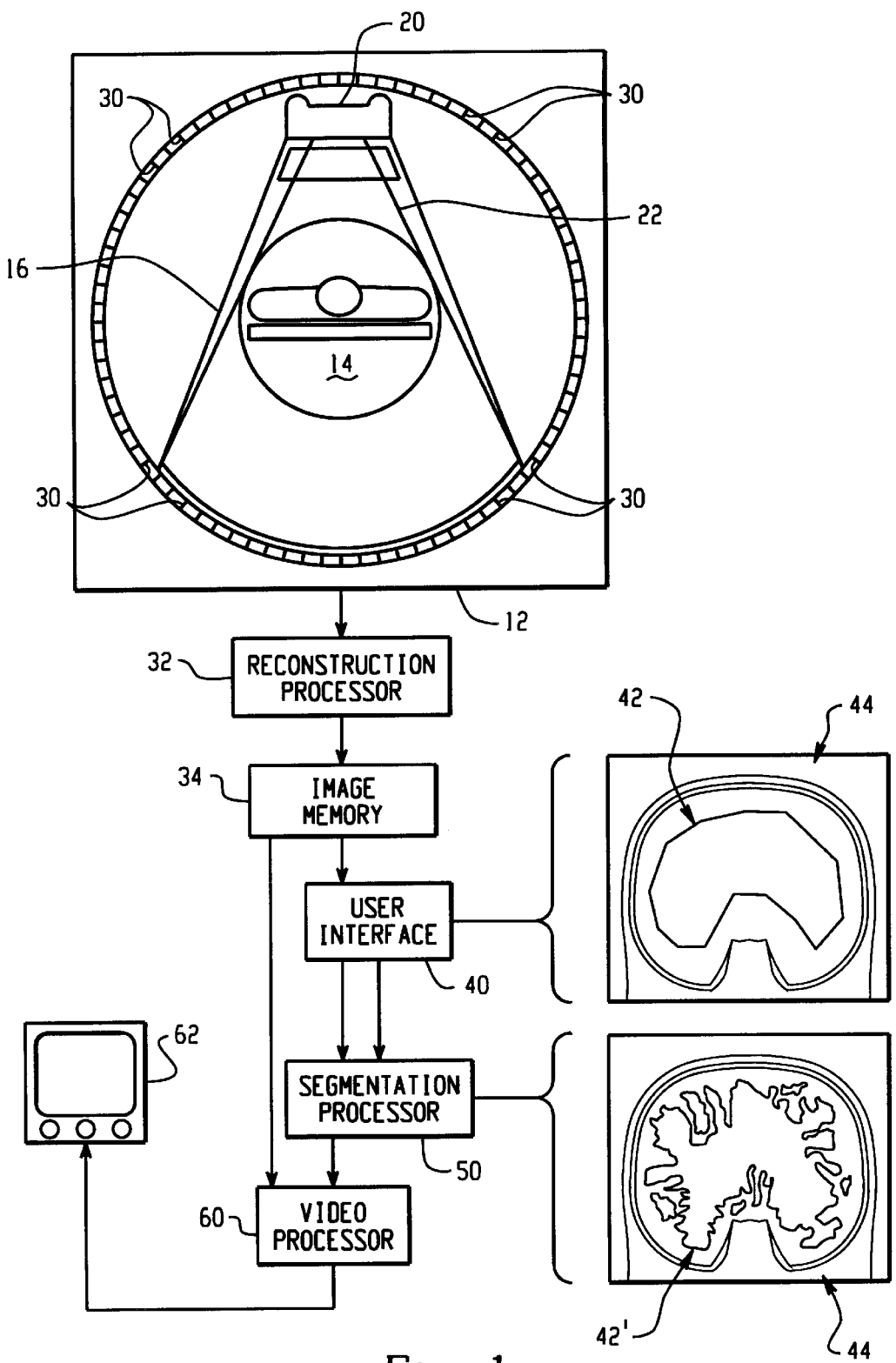
FIG. 1 is a diagrammatic illustration of an imaging apparatus employing the present invention.

Referring now to FIG. 1, a diagrammatic illustration of an apparatus to segment medical images is seen. An image generating device 12, is provided such as a CT scanner, nuclear camera, magnetic resonance imaging, ultra sound imager, or the like. The illustrated CT scanner includes a region of interest 14 through which x-rays 16 are passed. The x-rays 16 are generated by a conventional x-ray tube 20 and are collimated into a thin fan beam 22 or a plurality of generally parallel fans which pass through the region of interest 14. After passing through the region of interest 14, the attenuated x-rays are received on a plurality of radiation detectors 30 located opposite of the x-ray tube 20. Images from the detectors 30 are reconstructed by a reconstruction processor 32 into a volumetric image representation, a series of slice image representations, or a single slice image representation and stored in image memory 34. Of course, the digital image representations can come from other types of imaging devices or even combinations of imaging devices.

The digitized image data is provided to a user interface 40 for interaction from a user (not shown) such as a surgeon. The user manually places an initial contour 42 or zero level curve onto a representation of the digitized image data 44. The digitized image 44 and the zero level curve 42 are forwarded to a segmentation processor 50 which conforms the curve 42' to distinguishable boundaries within the digitized image data 44. The final curve 42' is forwarded to a video processor 60 for combination or registration with processed digitized image data for output on display 62. It should be appreciated that the final curve 42 may be continuous or split into two or more curves as the process progresses.

Figure 2:
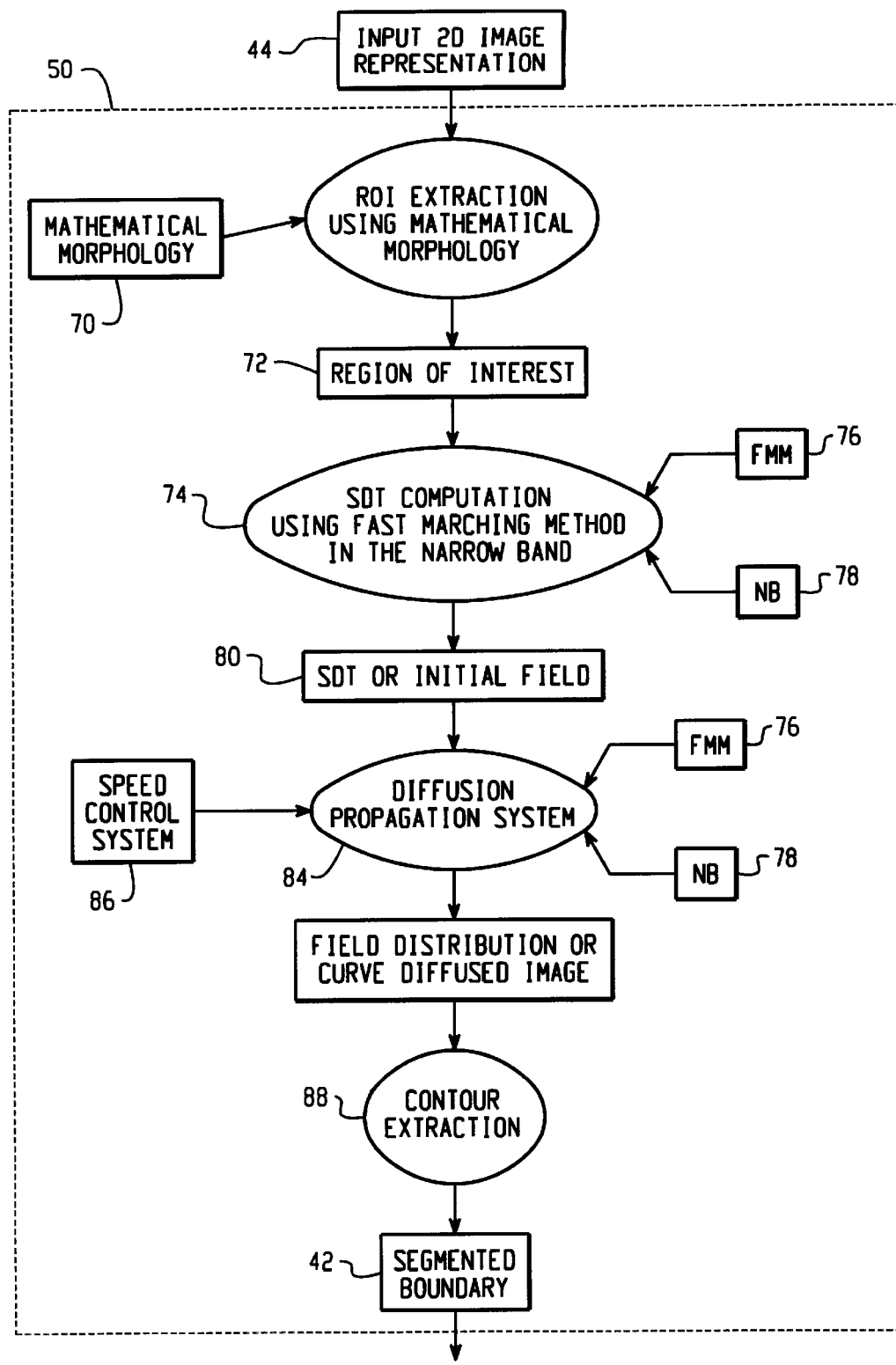
FIG. 2 is a process-object flowchart overview of the segmentation processor as seen in FIG. 1.

Referring now to FIG. 2, the segmentation processor 50 receives a two-dimensional gray scale representation of an organ cross-section 44, for example a gray matter and white matter image (GM/WM) or a cerebral spinal fluid emphasized image (CSF). A region of interest (ROI) is identified in the image 44 using mathematical morphology tools 70. This results in an estimate of the ROI 72.

The initial field distribution or signed distance transform is completed as shown in process 74. The process 74 receives two input tools; fast marching method tool 76 and the narrow band width 78. The output is shown in 80.

The next stage is the surface evolution or diffusion propagation system shown in process 84. It employs a speed control system 86 more fully discussed below, the fast marching method 76 and narrow band method 78. From the field distribution image we extract the contour using contour extraction program 88 which yields the segmented boundary 42'.

Figure 3:
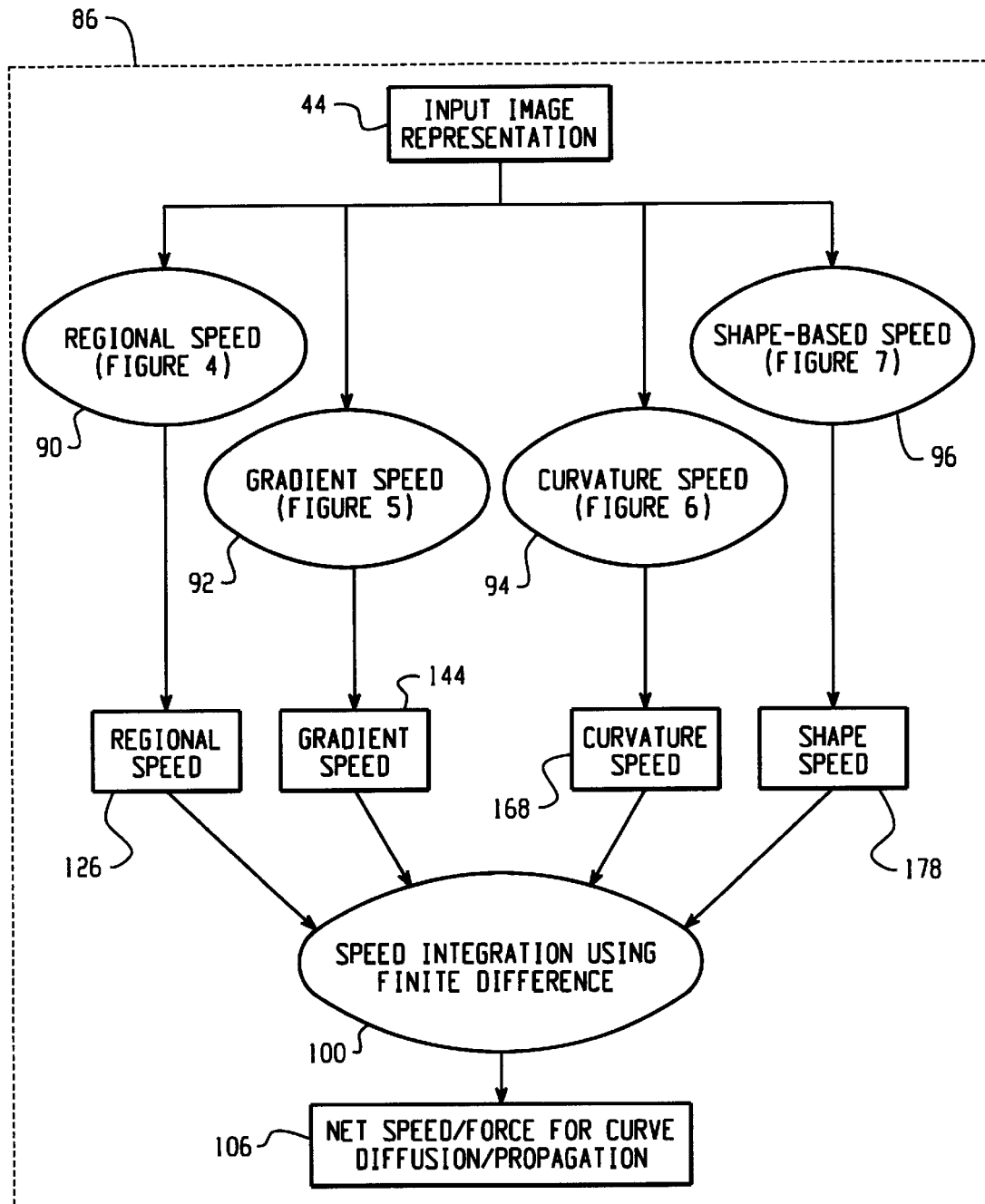
FIG. 3 is a process-object flowchart illustrating the speed control system of FIG. 2.

Referring now to FIG. 3, an overview of the speed control system 86 is detailed which drags the initial contour 42 using four exemplary propagation speed components. From the image 44, four speed functions are determined called regional speed 90, gradient or edge-based speed 92, curvature speed 94, and shape-based speed 96. More detail on the individual components is provided in the following Figures. A process 100 integrates all the propagation speed control functions 90, 92, 94, 96 and yields the net speed 106. This is the net force acting on the evolving curve.

Specifically, the propagation speeds are derived mathematically from classical parametric contouring modeling theory. The classical parametric contour model based on internal and external energy is given as:

$$\gamma \partial X/\partial t = \partial/\partial s(\alpha \partial X/\partial s) - \partial^2 X/\partial s(\beta \partial^2 X/\partial s^2) + F_{ext}(X)$$

| first term | ± | second term | external-energy |
|---|---|---|---|
| internal energy terms | | | | where, the first and second terms are the internal energy terms and the last term is the external energy terms. Also note the definition of the first two terms are the internal energy terms while the last term is the external energy term.

Since the second term of the internal energy term does not significantly affect the performance of the geometric deformable models, we can neglect this term and replace it with a force term which is a function of the normal to the curve N(X).

Thus, $F_{press}(X) = w_p(X) N(X)$.

Using the relationship $\epsilon = \alpha/\gamma$, $V_P = w_p/\gamma N(X)$ and $V_{ext} = F_{ext}(X)/\gamma$ and changing the transformation in terms of level frame work $\partial \phi/\partial t = V(\kappa) N$, where $N = \nabla \phi/|\nabla \phi|$, and $\partial/\partial s (\alpha \partial X/\partial s) \cdot N = \alpha \kappa$, we given the final curve/surface evolution as:

$$\partial \phi/\partial t = (\epsilon \kappa + V_p)|\nabla \phi| - V_{ext} \cdot \nabla \phi.$$

Generalizing this equation to incorporate other speed terms:

$$\partial \phi/\partial t = (\epsilon \kappa + V_p + V_s)|\nabla \phi| - V_{ext} \cdot \nabla \phi,$$

where $V_s$ is the speed due to shape.

So, we see the above equation has 4 speed terms which needs to computed.

The numerical implementation of the partial differential equation is given as:

$$\phi^{n+1}(x,y) = \phi^n(x,y) - \Delta t \{V_{reg}(x,y) + V_{grad}(x,y) + V_{shape}(x,y) - V_{cur}(x,y)\}$$

where, $\phi^{n+1}(x,y)$ and $\phi^n(x,y)$ are the level set functions at pixel locations (x,y) at times n and n+1. $\Delta t$ is the time difference.

Regional speed is computed using partial differential equations, gradients of level sets and forward and backward differences as under:

$$V_{reg}(x,y) = \max\{V_p(x,y),0\}\nabla^+ + \min\{V_p(x,y),0\}\nabla^-$$

$$V_p(x,y) = w_R * \{1 - 2u(x,y)\}^{-1}$$

$$\nabla^+ = \{\nabla_{x+}^+, \nabla_{y+}^+\}^{1/2}$$

$$\nabla^- = \{\nabla_{x-}^-, \nabla_{y-}^-\}^{1/2}$$

$$\nabla_x^+ = \max\{D^{-x}(x,y),0\}^2 + \min\{D^{+x}(x,y),0\}^2$$

$$\nabla_y^+ = \max\{D^{-y}(x,y),0\}^2 + \min\{D^{+y}(x,y),0\}^2$$

The difference operators are defined in terms of level set functions as:

$$D^{-x}(x,y) = \{\phi(x,y) - \phi(x-1,y)\}\{\Delta x\}^{-1}$$

$$D^{+x}(x,y) = \{\phi(x+1,y) - \phi(x,y)\}\{\Delta x\}^{-1}$$

$$D^{-y}(x,y) = \{\phi(x,y) - \phi(x,y-1)\}\{\Delta x\}^{-1}$$

$$D^{+y}(x,y) = \{\phi(x,y+1) - \phi(x,y)\}\{\Delta x\}^{-1}$$

Note $w_R$ is the weighting factor which controls the regional speed and convergence speed of the deformable model. u(x,y) is the membership function computed from the fuzzy mean clustering algorithm or pixel classification algorithm, given the number of classes of tissues in the image. For example, for the brain image, the number of classes are 4, WM, GM, CSF, and background. For a CT image, the number of classes could be less while in pathology images the number of classes could be more.

Gradient speed is computed using partial differential equations, gradients of level sets and forward and backward differences as under:

$$V_{grad}(x,y) = V_{gradx}(x,y) + V_{grady}(x,y)$$

$$V_{gradx}(x,y) = \max\{p''(x,y),0\}D^{-x}(x,y)\} + \min\{q''(x,y),0\}D^{+x}(x,y)\}$$

$$V_{grady}(x,y) = \max\{q''(x,y),0\}D^{-y}(x,y)\} + \min\{q''(x,y),0\}D^{+y}(x,y)\}$$

$$p''(x,y) = \nabla_x\{w_e \nabla (G_\sigma * I)\}$$

$$q''(x,y) = \nabla_y\{w_e \nabla (G_\sigma * I)\}$$

where, I is the original image, $G_\sigma$ is the Guassian operator with known standard deviation $\sigma$, and $D^{-x}(x,y)$, $D^{+x}(x,y)$, $D^{-y}(x,y)$, $D^{+y}(x,y)$ are the difference operators given as:

$$D^{-x}(x,y) = \{(\phi(x,y) - \phi(x-1,y)\}\{\Delta x\}^{-1}$$

$$D^{+x}(x,y) = \{(\phi(x1,y) - \phi(x,y)\}\{\Delta x\}^{-1}$$

$$D^{-y}(x,y) = \{(\phi(x,y) - \phi(x,y-1)\}\{\Delta x\}^{-1}$$

$$D^{+y}(x,y) = \{(\phi(x,y+1) - \phi(x,y)\}\{\Delta x\}^{-1}$$

Note $\nabla$ is the gradient operator and gradient is computed after smoothing the original image I with the Gaussian operator $G_\sigma$. The output of the process $\nabla (G_\sigma * I)$ is an edge image controlled by $w_e$, the edge weight factor and brings the robustness to the system. The output of $p''(x,y) = \nabla_x\{w_e \nabla (G_\sigma * I)\}$ and $q''(x,y) = \nabla_y\{w_e \nabla (G_\sigma * I)\}$ are the x and y components of the edge image for each pixel location. This is one method of computing the edge image. We can also incorporate any edge detection scheme such as likelihood method for computing the edges.

Shape speed is computed using partial differential equations, gradients of level sets and forward and backward differences as under:

$$V_{shape}(x,y) = V_{shapex}(x,y) + V_{shapey}(x,y)$$

The x and y components of the shape speed is computed as:

$$V_{shapex}(x,y) = \max\{p''(x,y),0\}D^{-x}(x,y)\} + \min\{q''(x,y)0\}D^{+x}(x,y)\}$$

$$V_{shapey}(x,y) = \max\{q''(x,y),0\}D^{-x}(x,y)\} + \min\{q''(x,y)0\}D^{+x}(x,y)\}$$

$$p''(x,y) = \nabla_x\{w_s \nabla (G_\sigma * U)\}$$

$$q''(x,y) = \nabla_y\{w_s \nabla (G_\sigma * U)\}$$

where U is the fuzzy membership image computed using the Fuzzy Mean Clustering algorithm, given the original image I and $D^{-x}(x,y)$, $D^{+x}(x,y)$, $D^{-y}(x,y)$, $D^{+y}(x,y)$ are the difference operators given as:

$$D^{-x}(x,y) = \{\phi(x,y) - \phi(x-1,y)\}\{\Delta x\}^{-1}$$

$$D^{+x}(x,y) = \{\phi(x+1,y) - \phi(x,y)\}\{\Delta x\}^{-1}$$

$$D^{-y}(x,y) = \{\phi(x,y) - \phi(x,y-1)\}\{\Delta x\}^{-1}$$

$$D^{+y}(x,y) = \{\phi(x,y+1) - \phi(x,y)\}\{\Delta x\}^{-1}$$

Note, $\nabla (G_\sigma * U)$ is again the edge detection process over the classified image. This brings the system very robust in clamping the deforming curves to the goal position. $w_s \nabla (G_\sigma * U)$ controls the weight of the edge computed from the membership function of the fuzzy clustering or pixel classification method. $\nabla_x\{w_s\nabla(G_\sigma*U)\}$ and $\nabla_y\{w_s\nabla(G_\sigma*U)\}$ are the x and y components of the shape speed terms. Note that $\nabla_x$ and $\nabla_y$ are the x-gradient and y-gradient operators run over the edge image.

Curvature speed is computed using partial differential equations, gradients of level sets and forward and backward differences as under:

$$V_{cur}(x,y) = \epsilon\kappa^n(x,y)\{(D^{0x}(x,y))^2 + (D^{0y}(x,y))^2\}^{1/2}$$

Where, $\kappa^n(x,y)$, $D^{0x}(x,y)$, and $D^{0y}(x,y)$ are given as:

$$\kappa^n(x,y) = \{\phi^2_{xx}\phi^2_y - \phi^2_x\phi^2_y\phi^2_{xy} + \phi^2_{yy}\phi^2_x\}\{\phi^2_x + \phi^2_y\}^{-3/2}$$

where, the terms $D^{-0x}(x,y)$ and $D^{-0x}(x,y)$ are defined as:

$$D^{0x}(x,y)\{\phi(x+1,y) - \phi(x-1,y)\}\{2\nabla x\}^{-1}$$

$$D^{0y}(x,y)\{\phi(x,y+1) - \phi(x,y-1)\}\{2\nabla y\}^{-1}$$

Figure 4:
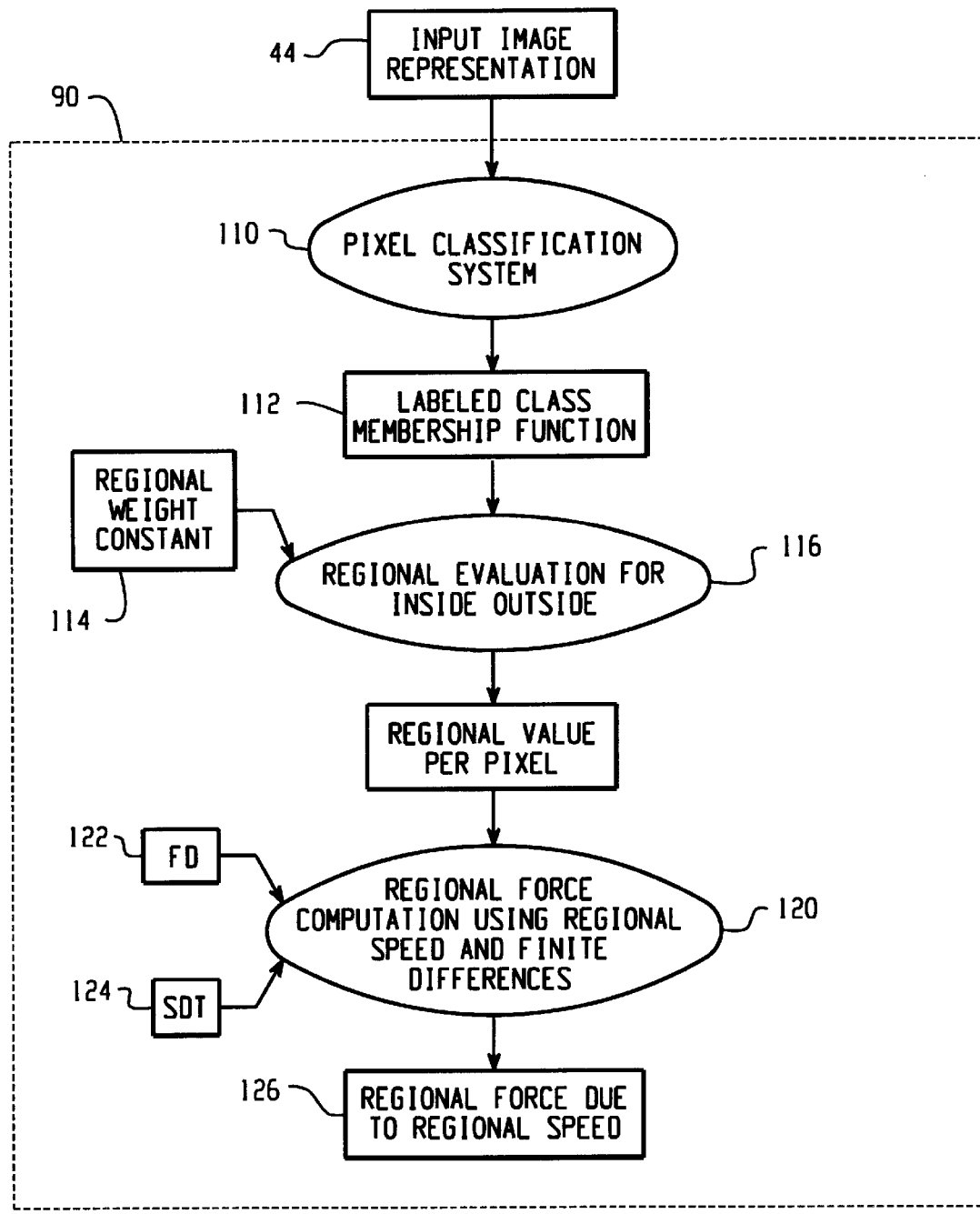
FIG. 4 illustrates a process-object flowchart illustrating a regional speed determination as seen in FIG. 3.

Referring now to FIG. 4, a sub-process is used to compute the regional speed term 90 from a gray scale image 44. Here the system computes a membership function for each pixel location. This is called partial volume compilation. Since each pixel or voxel is composed of a mixture of several tissue classes, a process 110 computes the percentage contribution of each class (tissue type) at a voxel. Such an algorithm is called pixel classification or voxel classification. The output of the process 110 includes an image where each pixel or voxel has been classified by tissue class 112. If there are "N" classes in the images 44, the process generates "N" different images, for example three images, one for each of GM, WM and CSF. These resulting classified images are combined with a region weight constant 114 in a regional evaluation processor 116 to give regional values for every pixel point (x, y). A regional force compilation processor 120 inputs calculations from a finite difference processor 122 and a signed distance transform processor 124. This outputs the regional force term shown in process 126.

Figure 5:
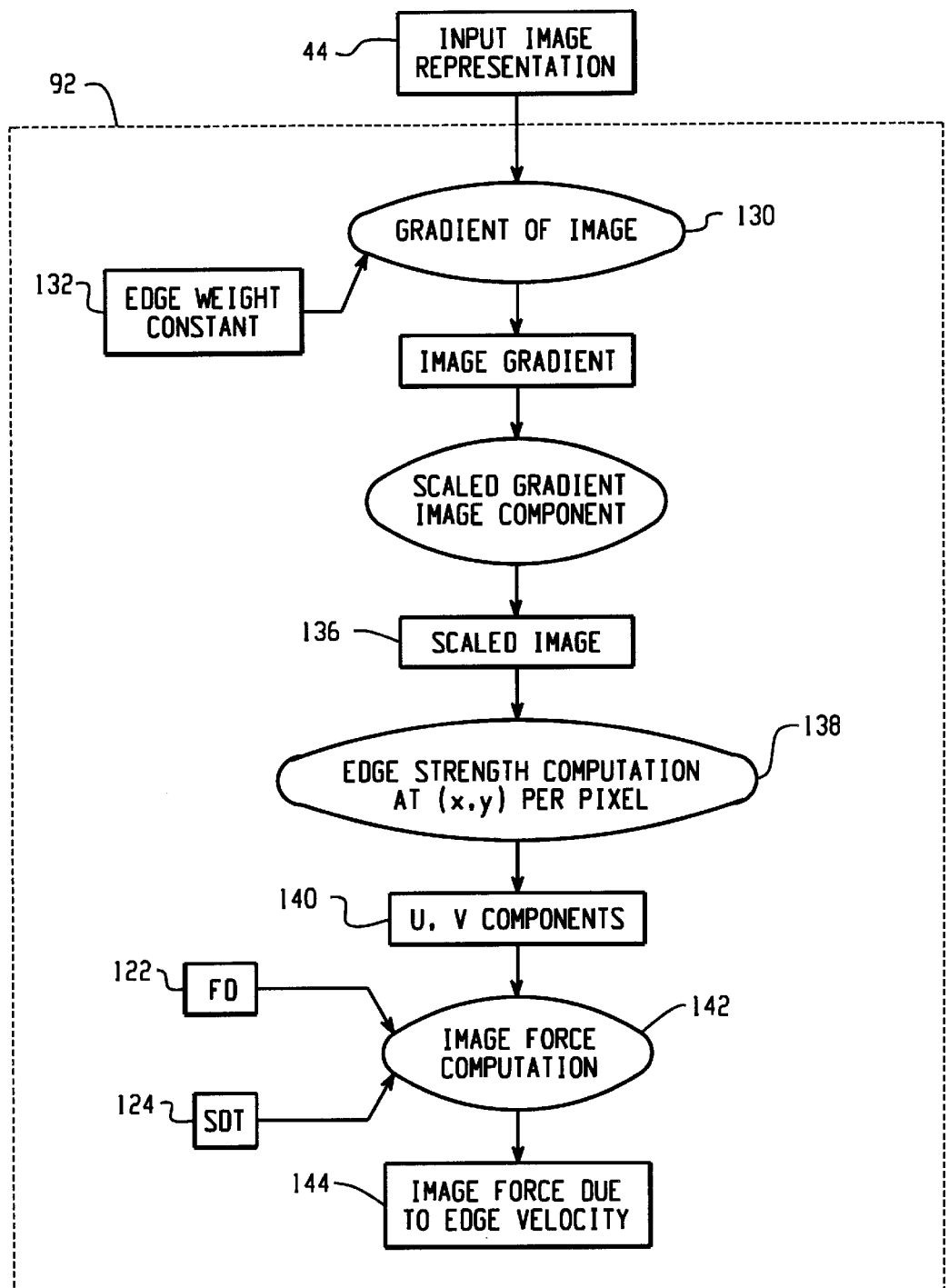
FIG. 5 illustrates a process-object flowchart illustrating a gradient speed determination as seen in FIG. 3.

Referring now to FIG. 5, the image/edge speed computation 92 is illustrated. This object-process diagram computes the image force due to edge velocity. The input is again the gray scale image 44. An image gradient is computed 130 based on an edge weight constant 132. The image gradient is then scaled between 0 and 1, in a process 136. From the scaled image, edge strength is computed at every pixel location (x and y) in a process 138 and outputs U, V 140 become components in an image force computation process 142 which also employs the finite difference 122 and signed distance transform 124. The edge component of speed results 144.

Figure 6:
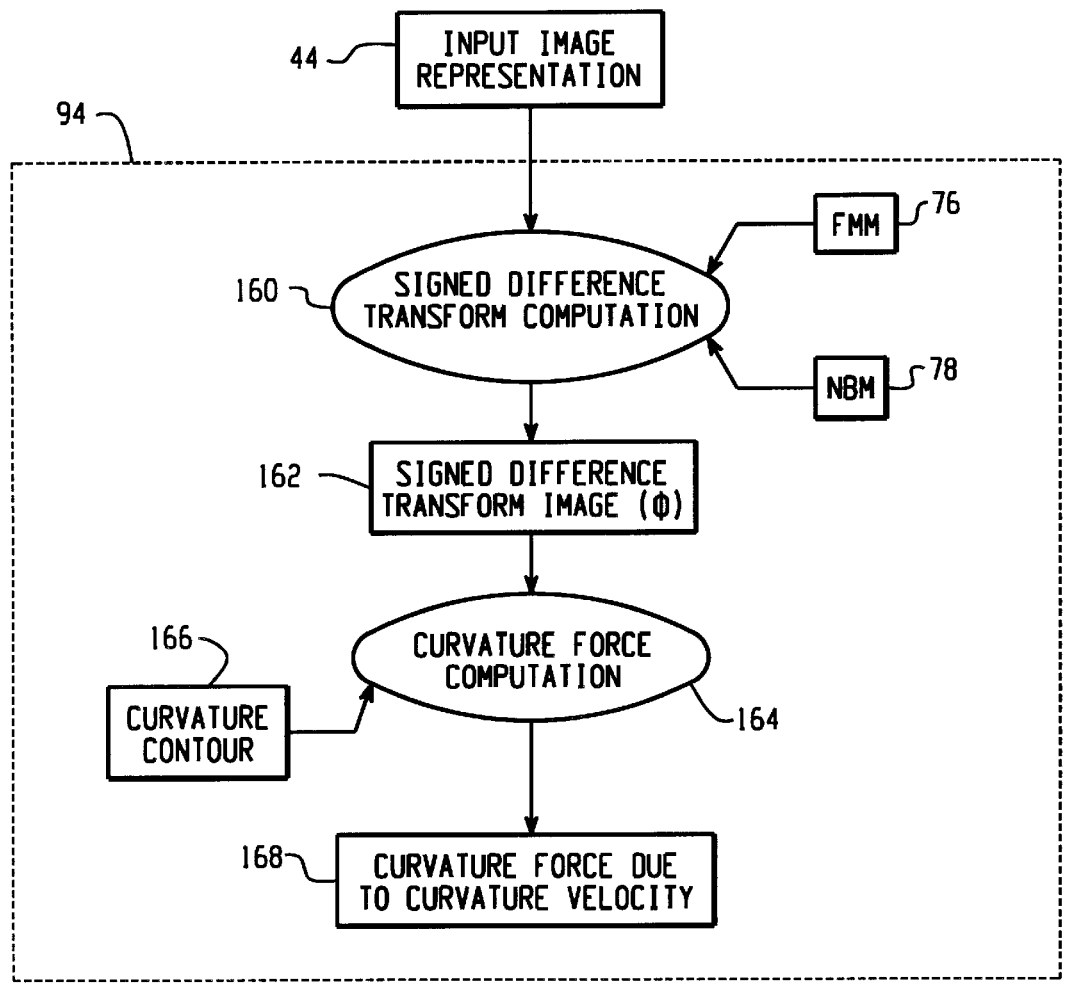
FIG. 6 illustrates a process-object flowchart illustrating a curvature speed determination as seen in FIG. 3.

Referring now to FIG. 6, the curvature speed term or curvature force determination 94 (FIG. 3) is illustrated. Again, the gray scale image 44 initiates the process. On the gray scale image 44 a signed distance transform process 160 operates using a curve layering method such as the fast-marching method (FMM) 76 and the narrow band method (NBM) 78 where the narrow band surrounds the contour. The output is a signed distance transform image or field phi 162. A curvature force process 164 combines the curvature contour 166 and the signed distance transform image 162. Curvature force or curvature velocity is output 168.

Figure 7:
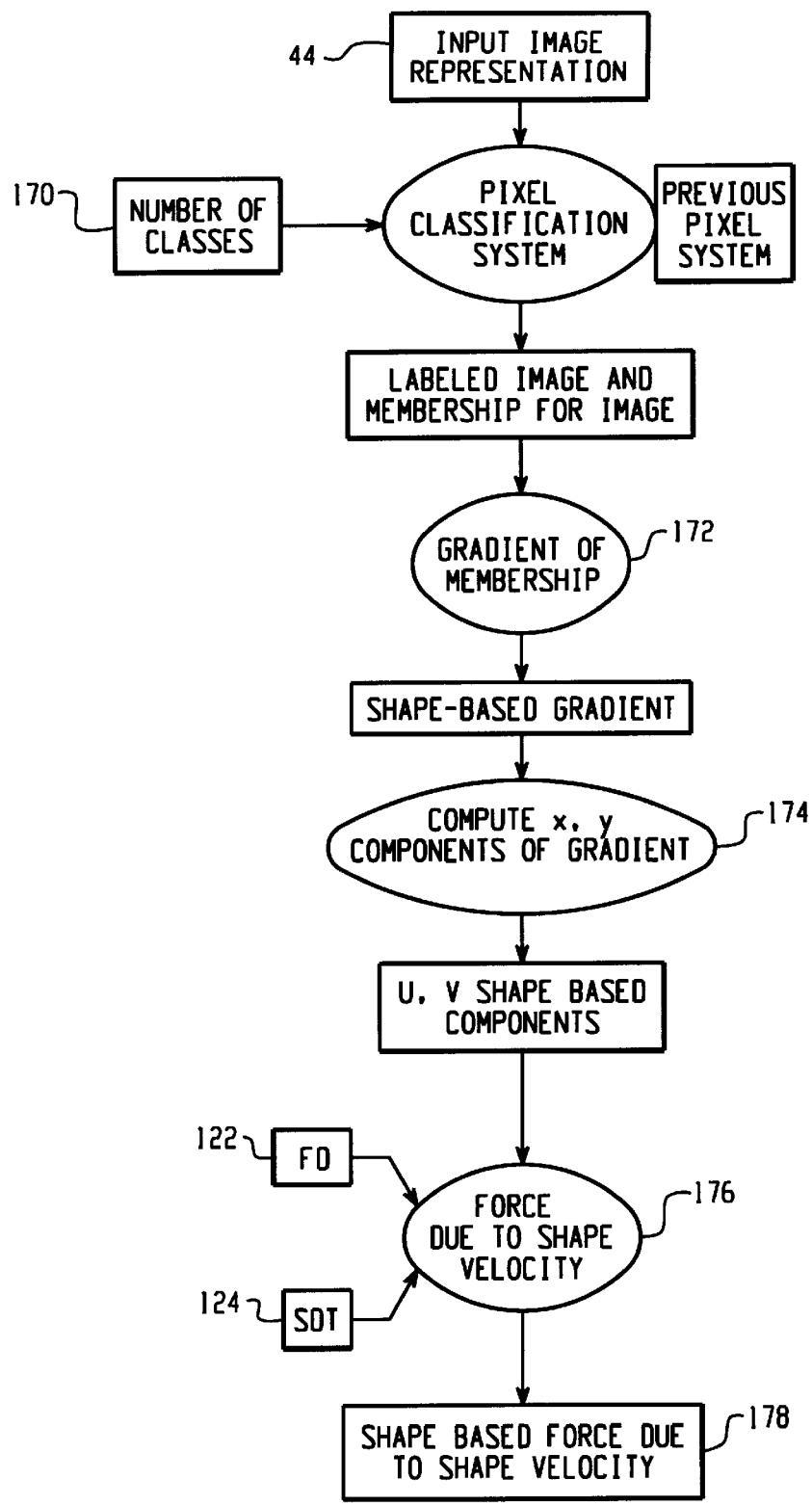
FIG. 7 illustrates a process-object flowchart illustrating a shape-based speed determination as seen in FIG. 3.

Referring now to FIG. 7, the shape-based speed component is also computed from the gray scale image 44. The shape-based speed is determined by first computing a pixel membership from a specified numbers of classes 170. The membership values are between the range of 0 and 1.

Next, a gradient of the membership image is computed, process 172, resulting in the gradient image. Components x and y of the shape-based gradient image are calculated, process 174. These are called the U-V components at each pixel component. The force is then computed in a process 176 from the signed distance transform 124 and the finite difference tool 122. The output of this sub-system is the shape velocity component 178.

Figure 8:
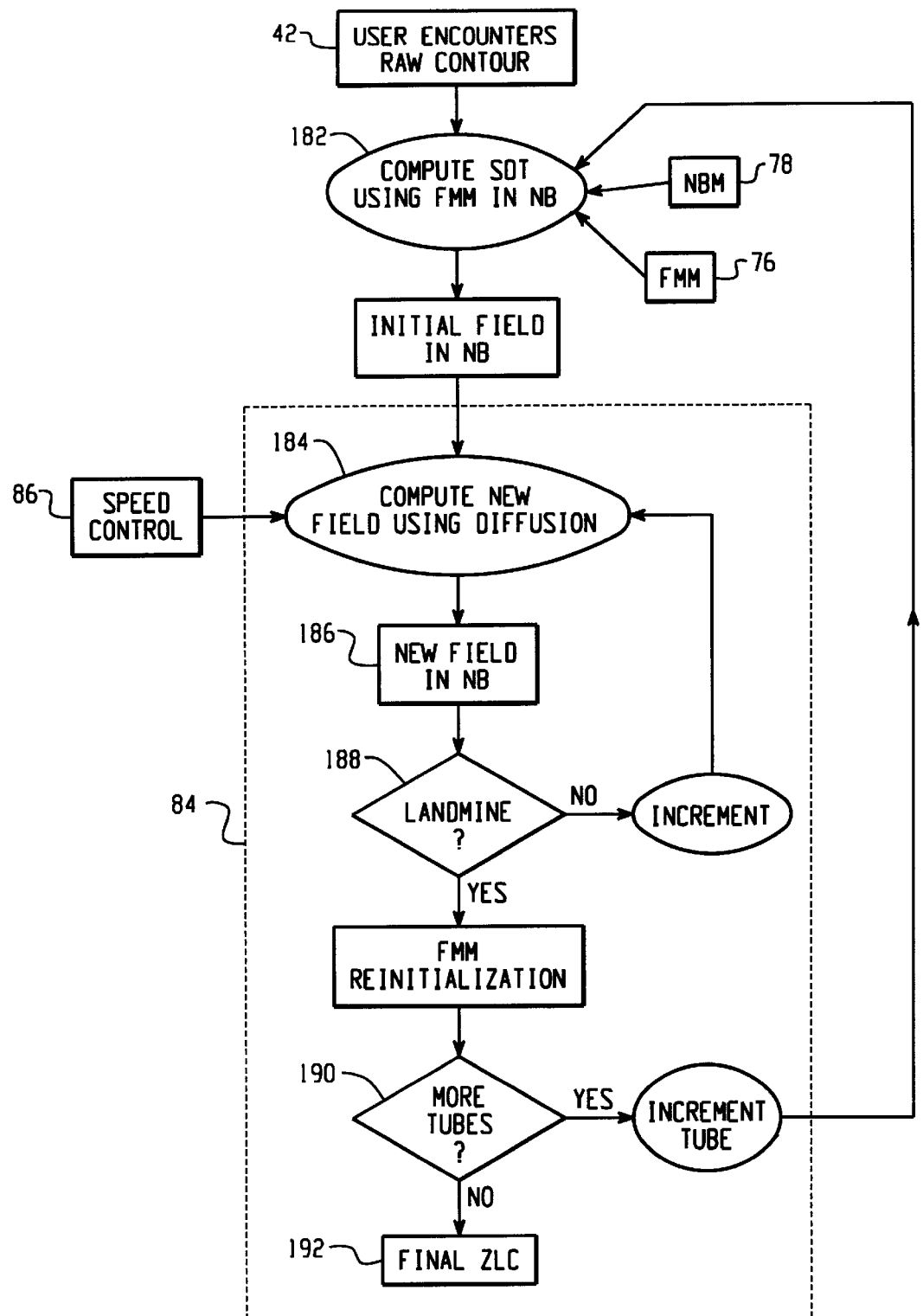
FIG. 8 illustrates a process-object chart illustrating diffusion propagation process as illustrated in FIG. 2.

Referring now to FIG. 8, diffusion propagation in the initial field using adaptive narrow band and fast marching method is illustrated. This is the algorithm used for computing the zero-level-curve (ZLC), the final estimated boundary. A user initiates the process by entering the raw contour 42. The initial field or initial signed distance function is computed in a process 182 resulting in the initial field in the narrow band. Now a new field is computed 184 based on the speed control functions 86 (FIG. 3). The output contains the new signed distance transform 186 in the narrow band.

Next, the new field is checked to determine whether "land mines" have been hit, decision block 188. The "land mines" are the border points. If a land mine is not hit, then the loop repeats. If a land mine is hit, the loop is exited indicating that an output contour has been reached, i.e. a point on the interface between two tissue types has been identified.

The process of tube reconstruction is repeated, decision block 190, until all the tubes have been processed. When this occurs, the system exits with a zero level curve (ZLC) estimate 192.

Figure 9A:
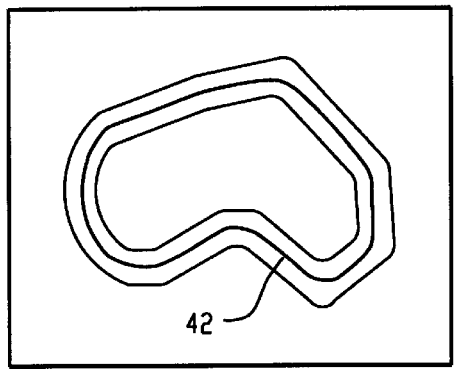
FIGS. 9A–9F illustrate successive examples of the evolution of a contour of an MRI image of a human brain.
Figure 9B:
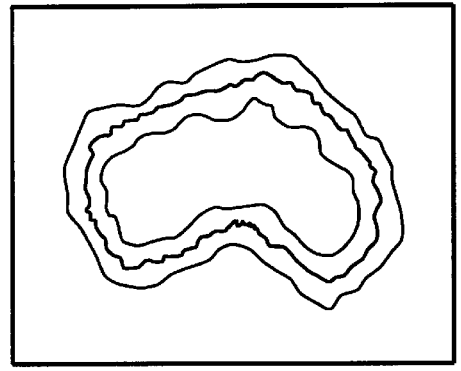
Figure 9C:
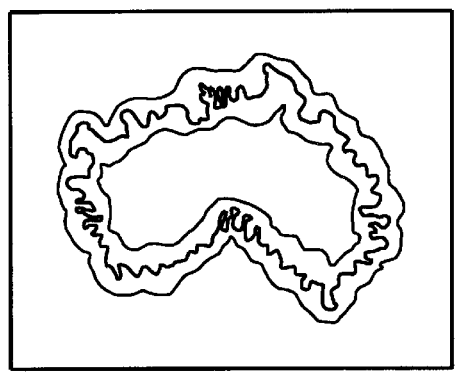
Figure 9D:
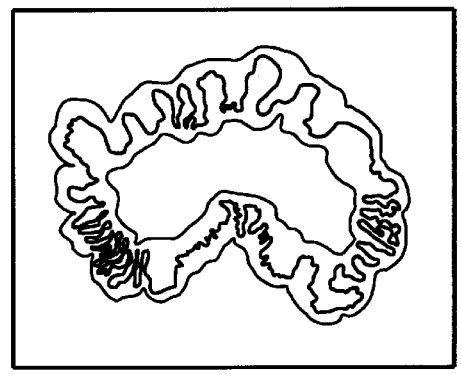
Figure 9E:
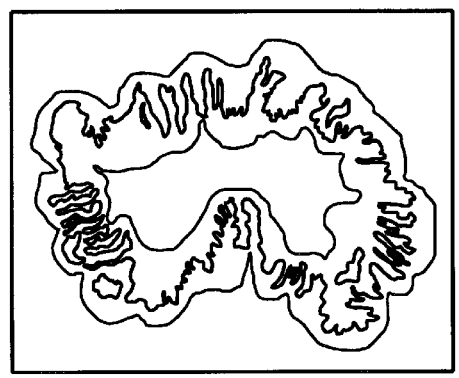
Figure 9F:
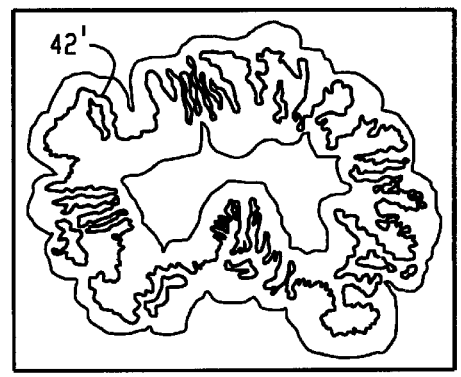

Referring now to FIGS. 9A–9F, a progression illustrates the growth or evolution of the zero level curve from the raw contour entered by the user 42 FIG. 9A, to the final contour 42 illustrated in FIG. 9F. The narrow band width in the illustrated example was twenty-five pixels on either side of the ZLC, with land mines being five pixels wide. Referring back generally to FIG. 8, the recursive nature of the algorithm disclosed results after a first pass in FIG. 9B evolving from FIG. 9A against a medical image (not illustrated) having defined pixel classifications. It is now apparent that the third iteration results in the illustration of FIG. 9C, and so on until the final contour 42 is reached as illustrated in FIG. 9F.

Figure 10:
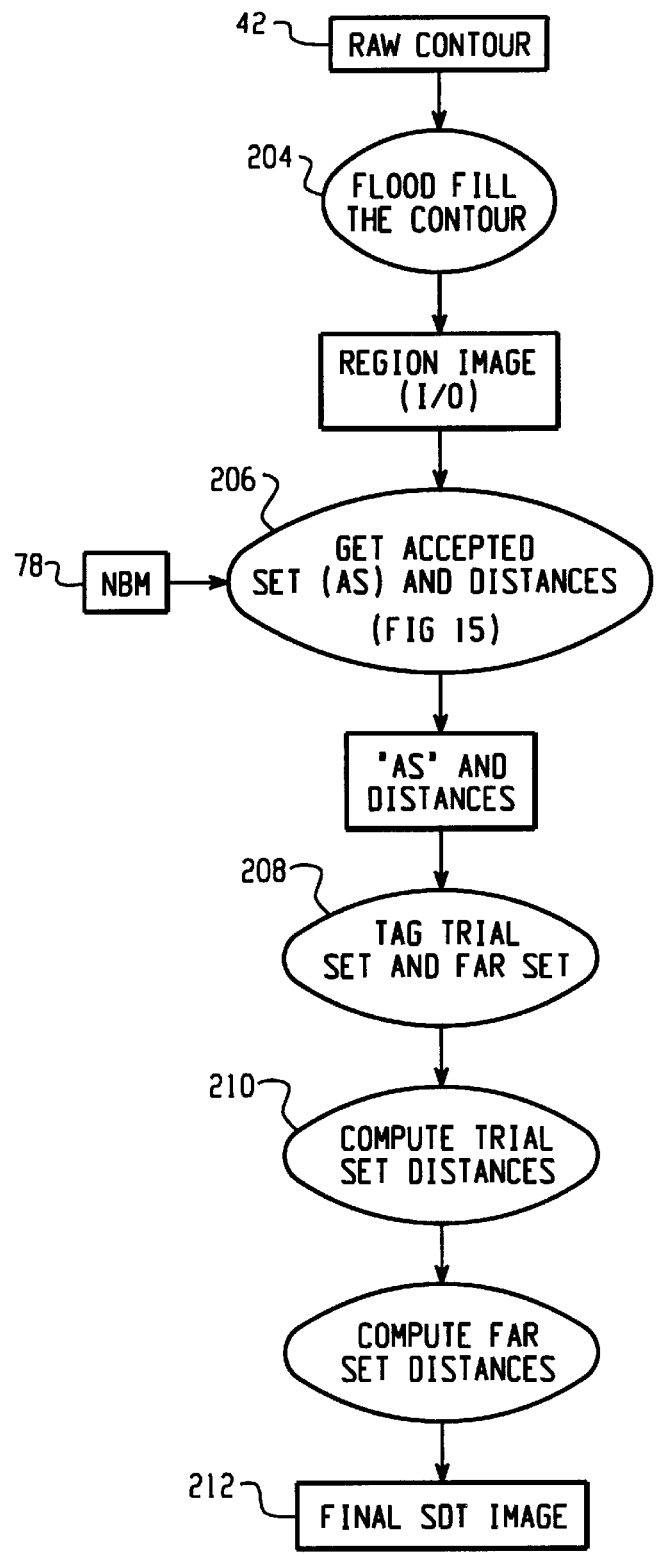
FIG. 10 is an object-process flowchart illustrating the fast marching method algorithm.

Referring now to FIG. 10, the fast-marching algorithm (76, FIG. 8) for signed distance transform computation in the narrow band using a neighborhood search method is illustrated. The input to this algorithm is a raw contour 42 (FIG. 1) as specified by the surgeon or user during image guided procedures. A flood-fill algorithm fills the region, process 204. Now with the narrow band process 78, the points or pixels which belong to an Accepted Set (AS) are computed, step 206. Further detail on this process will be provided below in connection with FIG. 14.

Selected pixel points in A Trial Set and a Far Set are tagged, step 208, and output. The distances in Trial Set and Far Set points are computed, step 210. In this way, the signed distance transform (SDT) 212 can be calculated from a raw contour.

Figure 11:
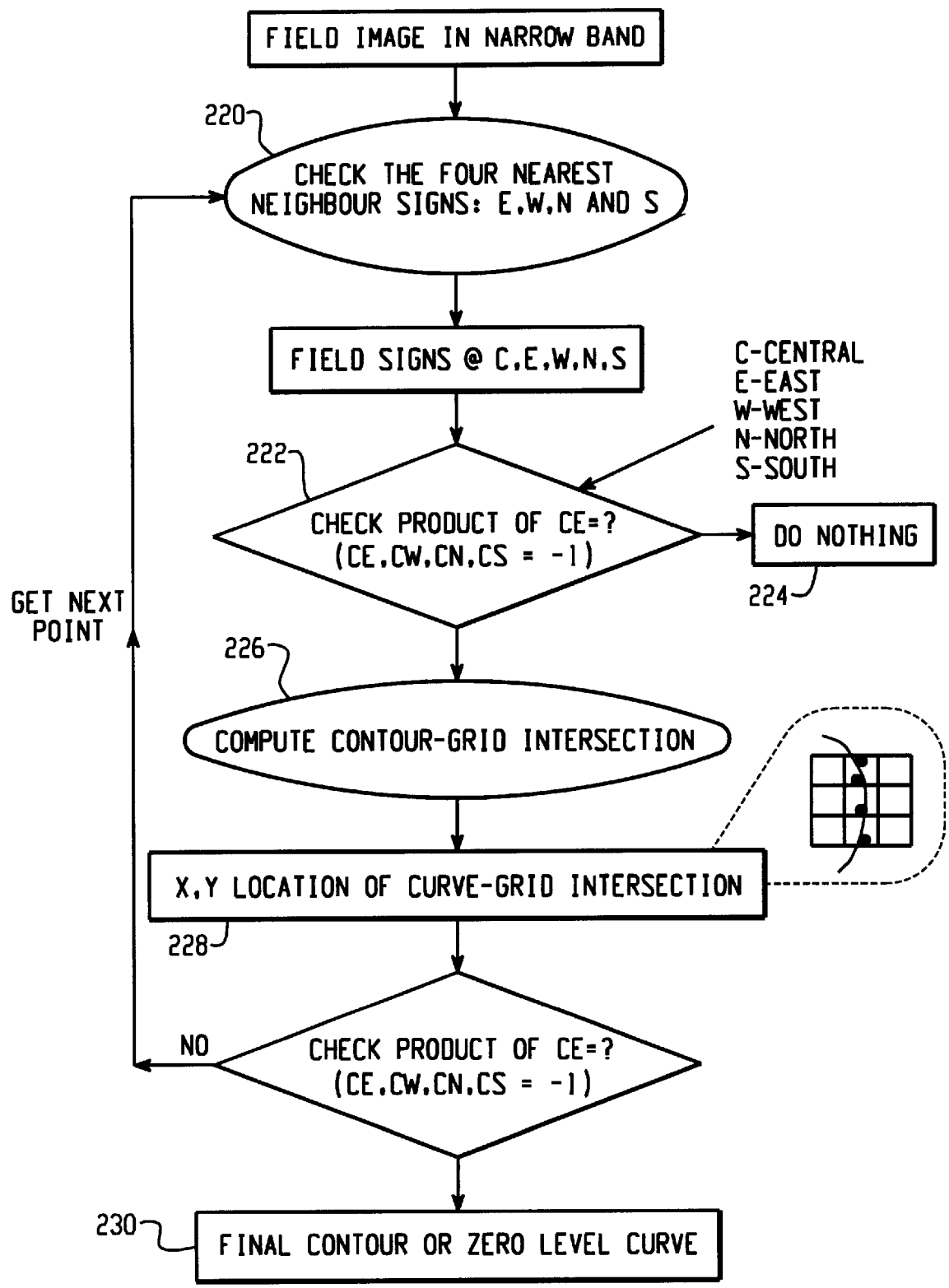
FIG. 11 is a process-object flowchart illustrating the computation of the zero level curve or contour.

Referring now to FIG. 11, a method of zero-level-curve computation or contour extraction from the field image is illustrated. This sub-system computes a zero-level-curve (ZLC) from a field image in a process called iso-contour extraction. For every pixel-point, the field signs of 4 neighbors (E, W, N, & S) are checked, process 220. Now the algorithm checks if there is a change in sign when we go from a central pixel to its neighboring pixel, decision block 222.

If the product is −1, a sign has changed and the algorithm proceeds. If there is no change in sign, no changes are implemented, object 224. If changes have occurred the intersection of the curve with the background grid is determined, process 226. The output is the x,y location of the curve-grid-intersection 228. After all points in the field have been checked, the ZLC or final contour 230 results.

Figure 12:
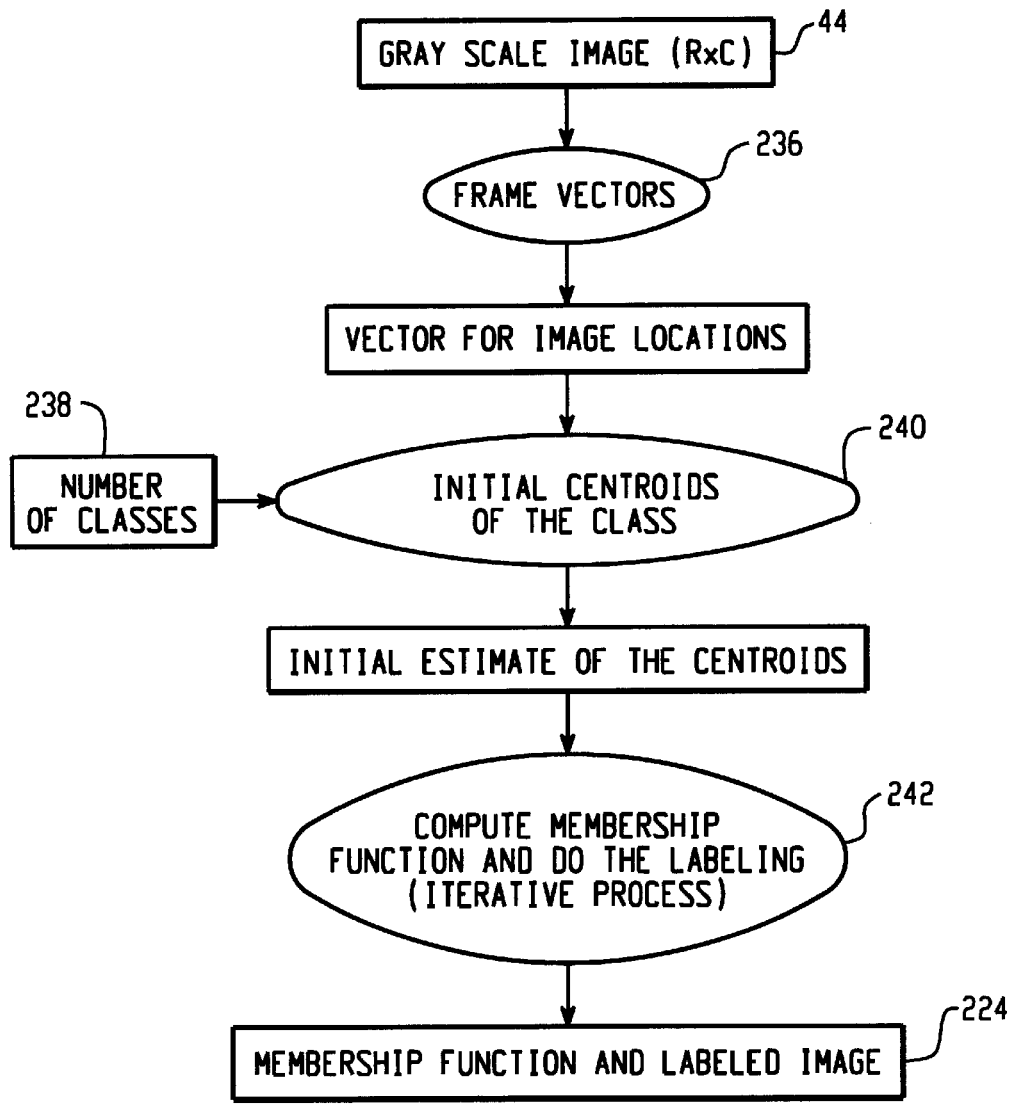
FIG. 12 is a process-object illustration of a pixel classification system.

Referring now to FIG. 12, an exemplary pixel classification system is illustrated. Previous figures have revealed the desirability of a pixel classification methodology to compute membership functions for each pixel location (see e.g. step 110 (FIG. 4), (FIG. 7)). A vector is framed from a gray scale image process 236. Now from an initial number of classes 238, the initial centroid for each cluster is computed, process 240. The output is the initial estimate of the centroids. A least squares algorithm is applied in process 242 to compute the labeled image and membership functions 244.

Figure 13:
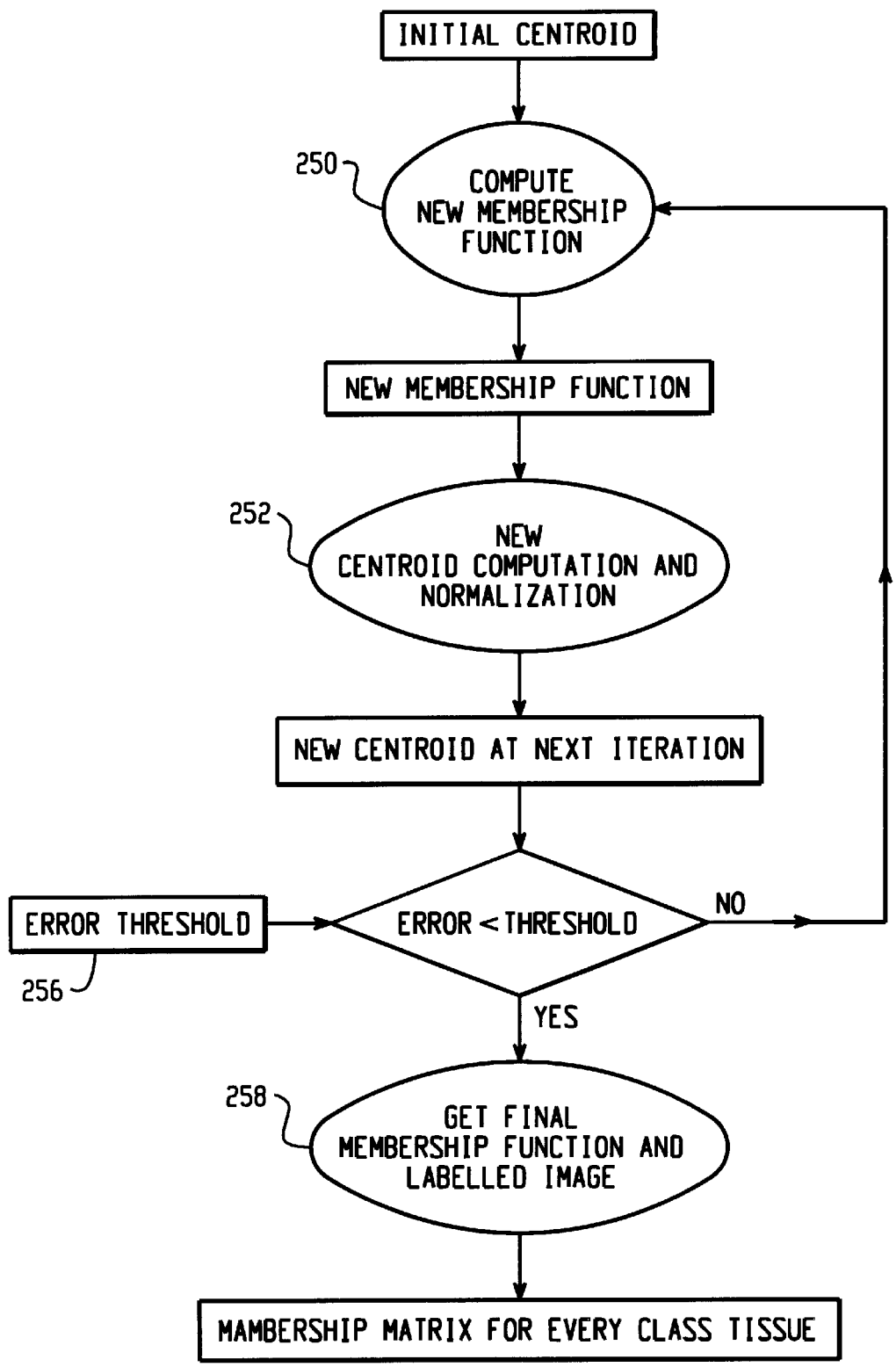
FIG. 13 illustrates a process-object flowchart illustrating pixel membership for estimation using an iterative least squares method.

Referring now to FIG. 13, an exemplary membership computation algorithm for regional force is illustrated. A new membership function is computed from the initial centroid, process 250. A new centroid is computed and normalized, process 252. If an error threshold 256 has not been reached, the process is repeated. If the centroid error is less than the threshold 256, then the membership computation function exits. Upon exit, the final membership function for each pixel location are determined, process 258.

Figure 14:
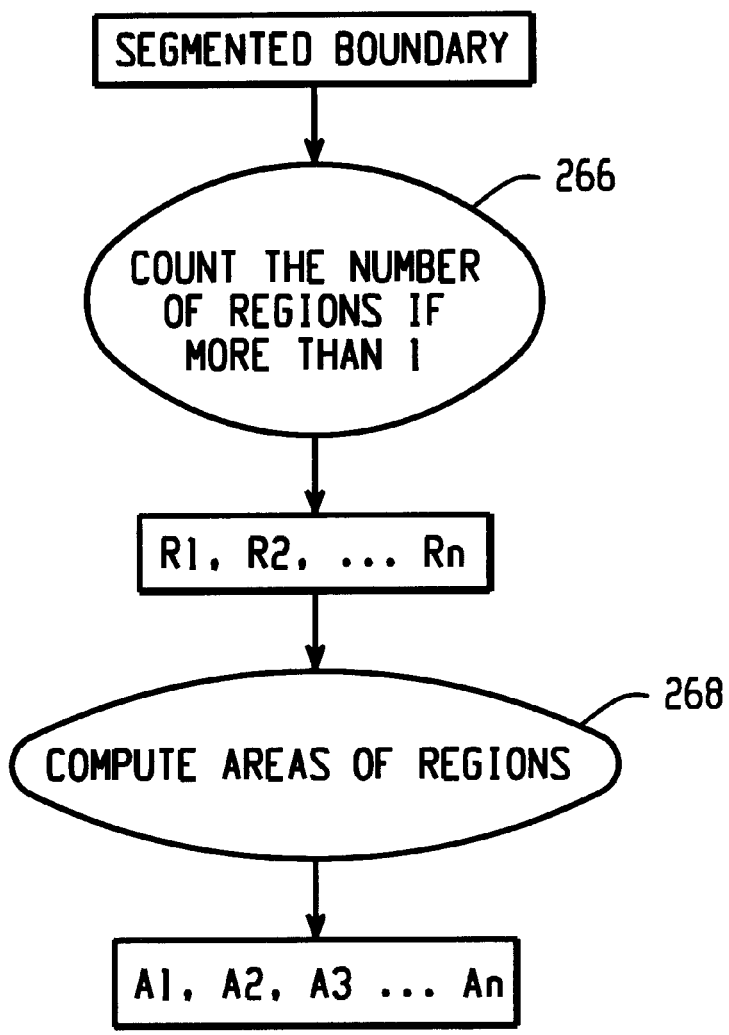
FIG. 14 is a process-object flowchart illustrating the quantification of various regions within a digitized medical image.

Referring now to FIG. 14, an exemplary quantification of white matter, gray matter, and CSF is illustrated. The number of regions in a segmented boundary are counted, process 266. The area of each of the regions ($R_1 \ldots R_n$) is computed in process 268, resulting in the output (quantified) regions having areas $A_{1, A2} \ldots A_n$ corresponding to "N" regions.

Figure 15:
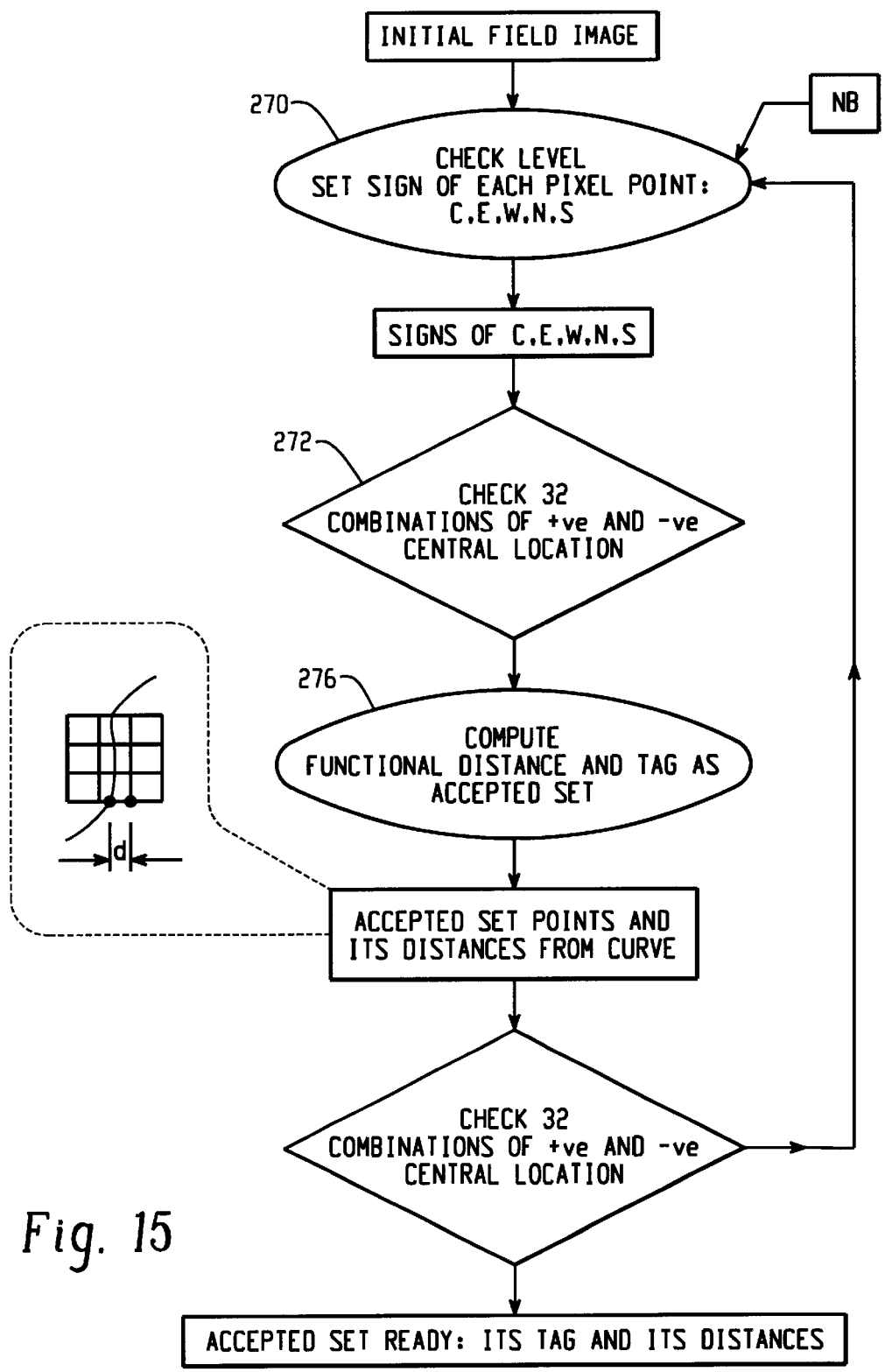
FIG. 15 is a process-object flowchart illustrating the computation of the accepted set as seen in FIG. 10.

Referring now to FIG. 15, an exemplary method to compile the Accepted Set using nearest neighbor search is illustrated. This is a sub-system to compute the distances and tags for the Accepted Set (FIG. 9, 206). Process 270 checks the sign of the field image ($\Phi$), given the initial field flow ($\Phi$). Next all signs are checked 272 for positive and negative signs (32 combinations) relative to a central location. Next, fractional distances and tags are computed, process 276. If all the points in the narrow band are finished, the Accepted Set is complete, if not, the method proceeds to the next point and cycles back to step 270 to check the next set of signs.

Referring now to Table 1, an exemplary set of results are illustrated for the case where the central pixel has a positive sign. This chart shows sixteen cases when the central pixel is positive and the neighboring pixels are negative The total number of neighboring pixels which are negative can be 1, 2, 3, or 4.

Case 1 to case 4 are when the neighboring pixel is negative.

Case 5 to case 10 are when 2 of the neighboring pixels are negative.

Case 11 to case 14 are when 3 of the pixels are negative.
Case 15 is when all the 4 neighboring pixels are negative.
Case 16, when none are negative.

TABLE 1

32 Combination Cases
If Central Pixel (C) is Positive Sign

| | E | W | N | S | |
|---|---|---|---|---|---|
| 1. | − | + | + | + | When |
| 2. | + | − | + | + | 1 |
| 3. | + | + | − | + | is |
| 4. | + | + | + | − | Negative |
| 5. | − | + | − | + | When |
| 6. | − | + | + | − | 2 |

TABLE 1-continued

32 Combination Cases
If Central Pixel (C) is Positive Sign

| | E | W | N | S | |
|---|---|---|---|---|---|
| 7. | + | − | − | + | are |
| 8. | + | − | − | + | negative |
| 9. | − | − | + | + | |
| 10. | + | + | − | − | When |
| 11. | + | − | − | − | 3 |
| 12. | − | + | − | − | are |
| 13. | − | − | + | − | Negative |
| 14. | − | − | − | + | |
| 15. | − | − | − | − | When 4 are negative |
| 16 | 0 | 0 | 0 | 0 | When none are negative |

Referring now to Table 2, an exemplary set of results are illustrated for the case where the central pixel has a negative sign.

Case 17 to case 20 shows when 1 neighboring pixel is positive.

Case 21 to case 26 shows when 2 neighboring pixels are positive.

Case 27 to case 30 shows when 3 neighboring pixels are positive.

Case 31 shows when all 4 neighboring pixels are positive.
Case 32 shows when none of the 4 neighboring pixels are positive.

TABLE 2

If Central Pixel (C) is Negative Sign

| | E | W | N | S | |
|---|---|---|---|---|---|
| 17. | + | − | − | − | When |
| 18. | − | + | − | − | 1 |
| 19. | − | − | + | − | is |
| 20. | − | − | − | + | Positive |
| 21. | + | − | + | − | |
| 22. | + | − | − | + | When |
| 23. | − | + | − | + | 2 |
| 24. | − | + | + | − | are |
| 25. | + | + | − | − | Positive |
| 26. | − | − | + | + | When |
| 27. | − | + | + | + | 3 |
| 28. | + | − | + | + | are |
| 29. | + | + | − | + | Positive |
| 30. | + | + | + | − | |
| 31. | + | + | + | + | When 4 are Positive |
| 32. | 0 | 0 | 0 | 0 | When none are Positive |

Figure 16:
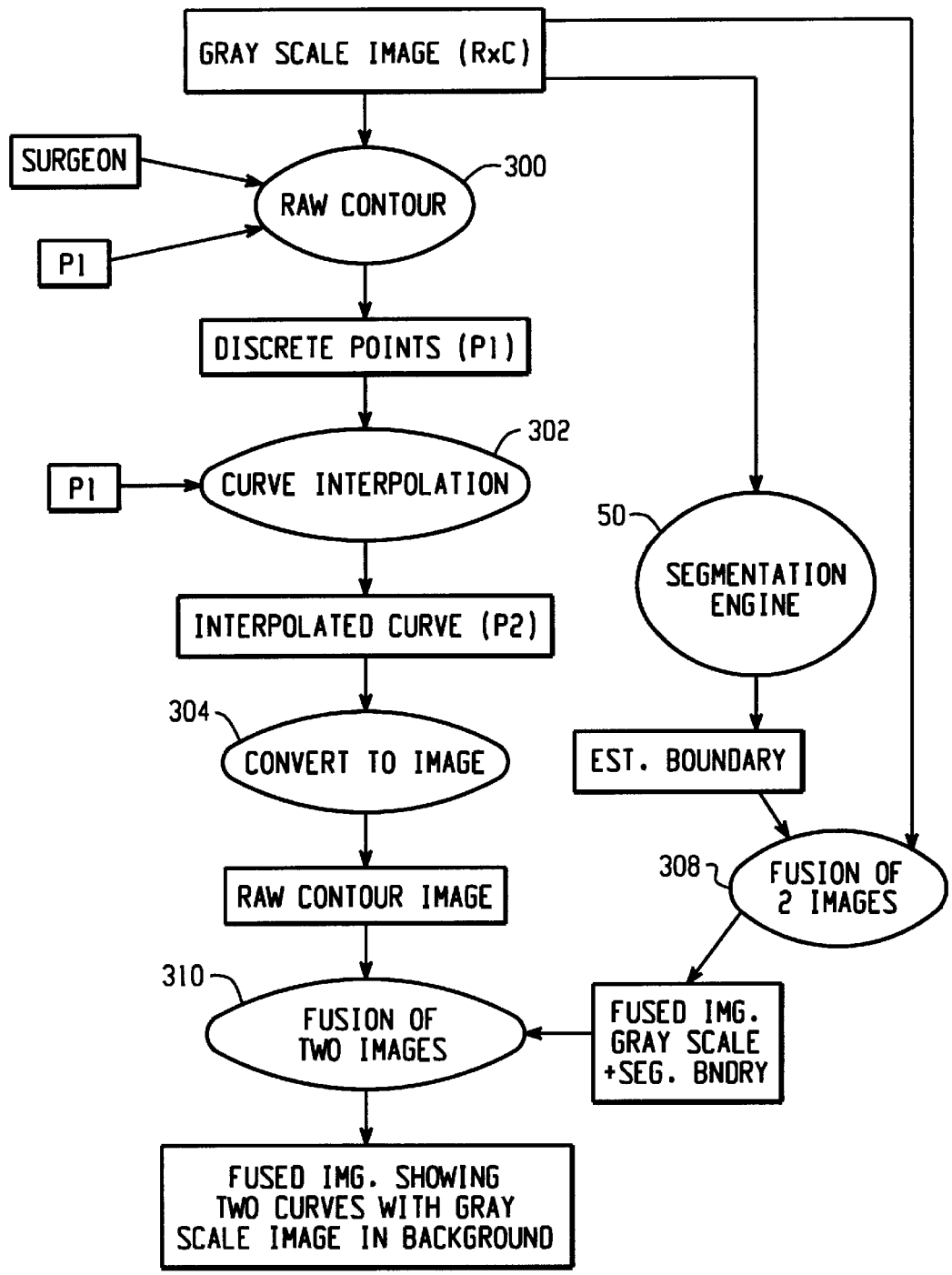
FIG. 16 is a process-object flowchart illustrating diffusion of various images for visualization or display.

Referring now to FIG. 16, an exemplary method is illustrated to show a fusion of 2 curves over the gray scale image. The two curves could be the raw initial curve (as drawn by the surgeon or user) and the second curve could be the estimated boundary of either WM, GM, or CSF for example.

A number of points $P_1$ which constitute the raw curve are defined, step 300. The points $P_1$ are interpolated into a modified curve $P_2$, step 302. Curve $P_2$ is converted into an image, in process 304, such as a raw contour image. The gray scale image is also provided to the segmentation system 50 (FIG. 1) which yields the estimated boundary image. The boundary image is fused and/or registered with the raw image, process 308.

This fused output is fused again with the raw contour from step 304 to yield 2 contours (raw and estimated) fused with the background gray scale image in process 310.

Figure 17:
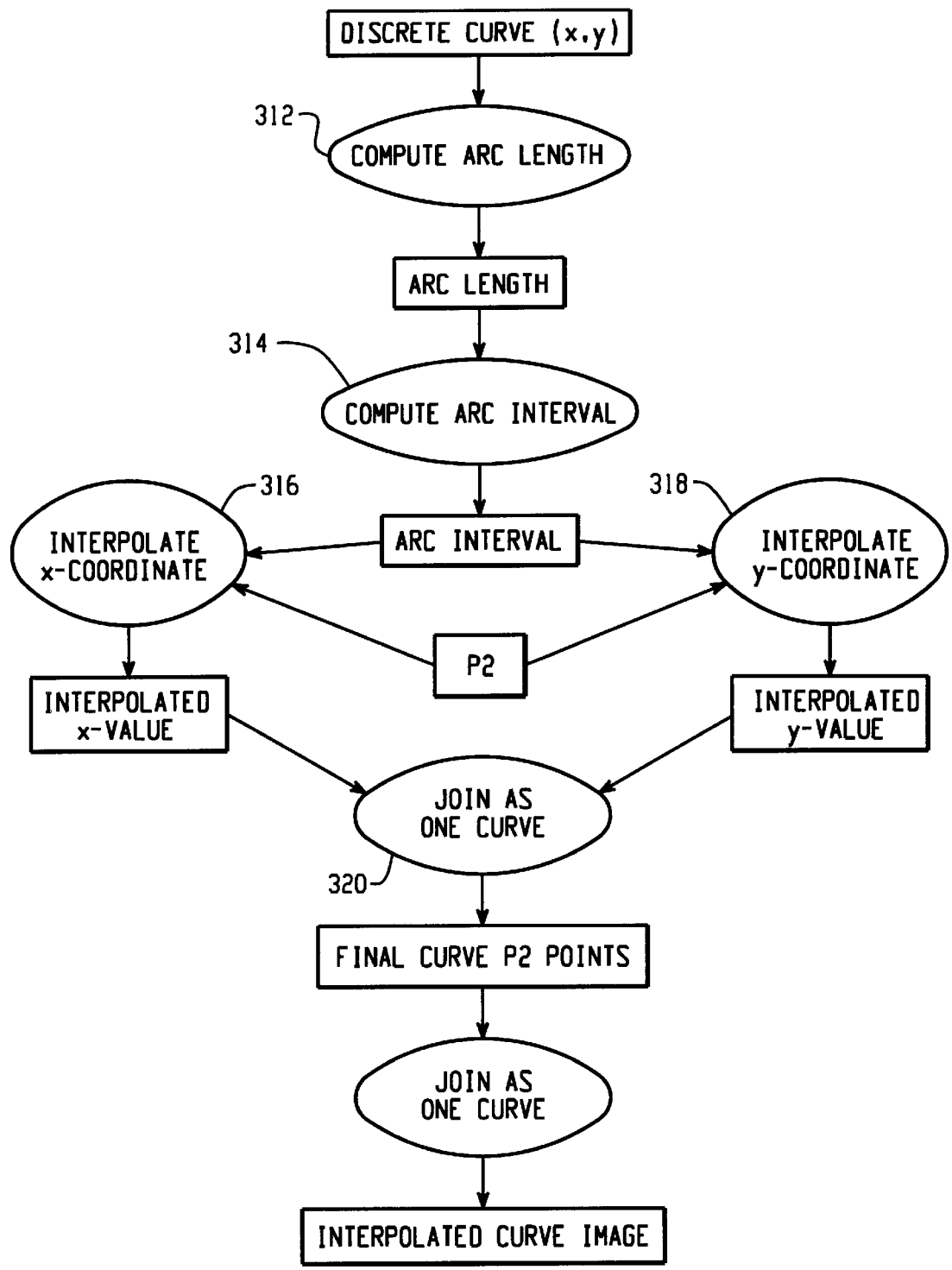
FIG. 17 is a process-object flowchart illustrating curve interpolation for fusion and overlay image generation; and, FIG. 18 illustrates a process-object flowchart detailing subsystems of the graphical user interface according to the present invention.

Referring now to FIG. 17, an exemplary method of curve interpolation for fusion and over-image generation based on sampling is illustrated. This is a sub-system which generates an interpolated curve image given the discrete contour (say $P_1$ number of points). An arc length or partial perimeter is computed, process 312 from which an associated arc interval is computed, process 314. The x-coordinate is interpolated (with $P_2$ number of points) in process 316. In parallel, the y-coordinate is interpolated (with $P_2$ number of points) in process 318. Each x and y are joined as one curve, process 320, and converted to an image. This is called interpolated curve image.

Figure 18:
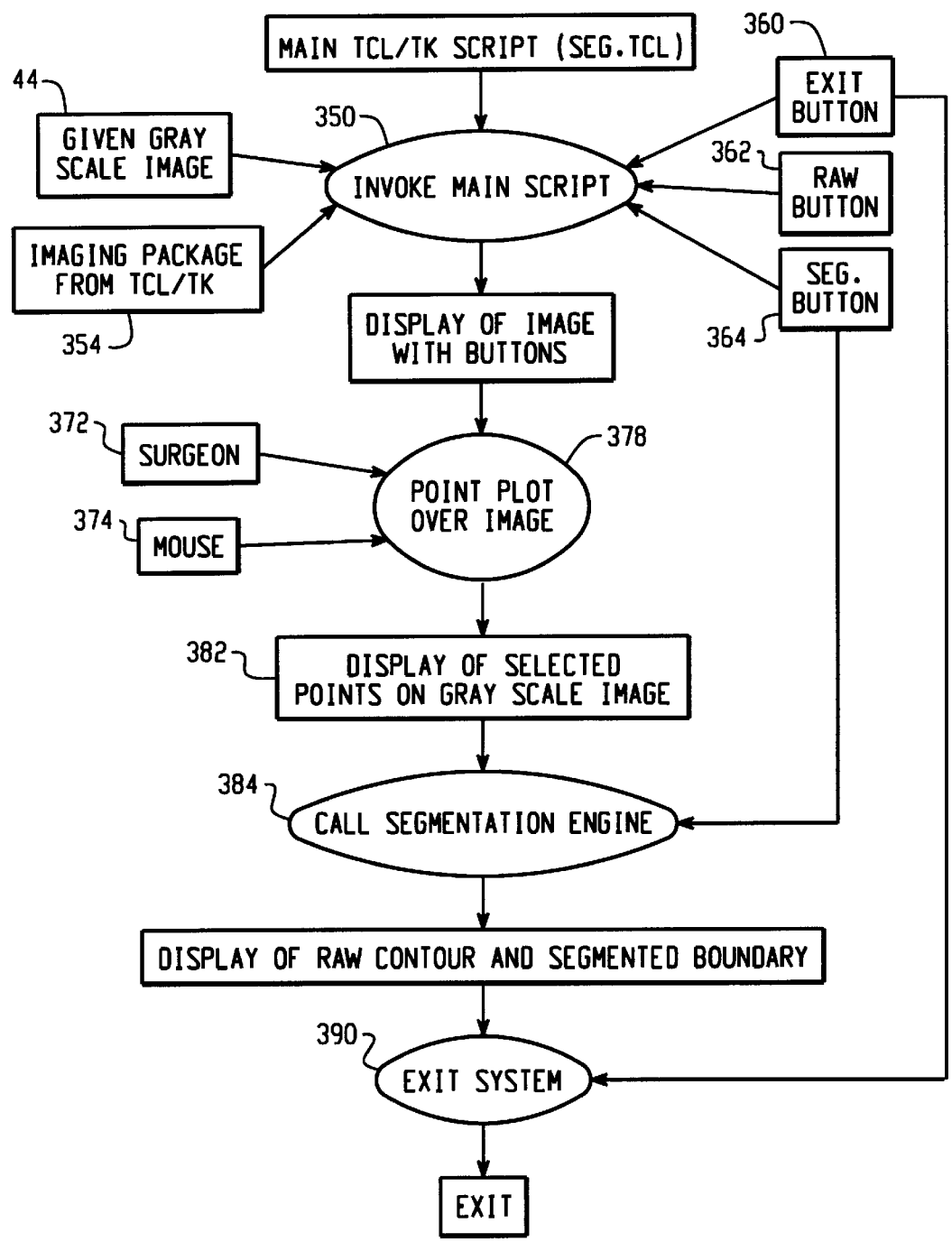

Referring now to FIG. 18, a graphical user-interface of the segmentation engine is illustrated. This is an exemplary sub-system for creating the graphical user-interface (GUI), preferably using tcl/tk.

The main script is invoked, step 350, having access to the gray scale image 44 and imaging package 354. In the illustrated embodiment, the graphical interface has 3 buttons, namely an exit button 360, raw contour button 362 and segmentation button 364. On invoking the script 350 the image 44 is displayed, step 370. The surgeon or user 372 manipulates a mouse 374 to draw the initial contour or points 42 on the image, step 378. The points are registered and plotted over the image, step 382.

Upon selection of the segmentation button 364, the segmented boundary is created as seen in step 384. Upon selection of the exit button 360, the system exits as seen in step 390.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of segmenting a medical image comprising:
   determining a region of interest on the medical image;
   estimating a contour corresponding to a segment of the image;
   computing a propagation speed indicative of a rate at which the contour changes as the estimated contour approaches a final contour;
   computing an altered contour within the region of interest based on a previous contour and the propagation speed; and
   extracting the final contour from the region of interest.

2. The method of segmenting a medical image as set forth in claim 1, where the region of interest comprises a first set of pixels distinguishable from other sets of pixels in the medical image and the extracting a final contour step comprises repetitively adjusting the altered contour until the altered contour substantially circumscribes the first set of pixels.

3. The method of segmenting a medical image as set forth in claim 2, where the first set of pixels includes one of the set of white matter, gray matter, and cerebral spinal fluid.

4. A method of segmenting a medical image comprising:
   determining a region of interest on the medical image, the region of interest including a first set of pixels having a defined similarity to each other;
   computing a propagation speed indicative of a rate at which a contour changes;
   computing an altered contour within the region of interest based on a previous contour and the propagation speed; and
   extracting a final contour from the region of interest by repetitively adjusting the altered contour until the altered contour substantially circumscribes the first set of pixels.

5. The method of segmenting a medical image as set forth in claim 1, where the propagation speed includes curvature speed relating to curvature of the contour.

6. A method of segmenting a medical image comprising:
   selecting a region of interest on the medical image;
   computing a propagation speed indicative of a rate at which a contour changes, the propagation speed includes including at least one of:
      region speed relating to the determined region of interest,
      gradient speed relating to gradient information of the medical image, and
      shape speed relating to a shape of the contour;
   computing an altered contour within the region of interest based on previous contour and the propagation speed; and
   extracting a final contour from the region of interest.

7. The method of segmenting a medical image as set forth in claim 1, where the propagation speed includes gradient speed relating to gradient information of the medical image.

8. The method of segmenting a medical image as set forth in claim 1, where the propagation speed includes shape speed relating to a shape of the contour.

9. A method of segmenting a medical image comprising:
   determining a region of interest on the medical image;
   computing a propagation speed indicative of a rate at which a contour changes;
   computing an altered contour within the region of interest based on a previous contour and the propagation speed;
   computing a signed distance transform of a previous contour using a curve layering method in a band surrounding the contour; and
   extracting a final contour of the region of interest.

10. The method of segmenting a medical image as set forth in claim 9, where the computing a signed distance transform step comprises:
   determining an accepted set of pixels;
   tagging a trial set of pixels and a far set of pixels; and
   calculating distances of the trial set from the accepted set and calculating distances of far set from the accepted set.

11. The method of segmenting a medical image as set forth in claim 1, further comprising:
   registering the medical image with the final contour; and
   displaying the registered medical image and final contour.

12. A method of circumscribing an object in a medical image comprising:
   determining an accepted set of pixels around a contour on the image;
   tagging a trial set of pixels and a far set of pixels;
   calculating distances of the trial set from the accepted set and calculating distances of the far set from the accepted set; and
   iteratively computing an altered contour on the image based on the distances calculated including determining a rate of contour change by calculating a speed function controlled by regional, gradient, and curvature change speeds.

13. A medical imaging apparatus comprising:
   a source of digitized medical image data;

a user interface which allows a user to input an initial contour onto a representation of the digitized medical image data;

a segmentation processor which adjusts the contour to boundaries within the digitized medical image data, the segmentation processor including:

a mathematical morphology algorithm which identifies a region of interest in the image data;

a fast marching method algorithm which computes a signed distance transform (SDT) in a narrow band within the region of interest;

a speed control algorithm which determines a rate at which the SDT changes;

a propagation algorithm which diffuses the SDT at the rate determined; and, a processor which processes the contour and image data for display.

14. The medical imaging apparatus as set forth in claim 13, where the speed control algorithm comprises:

a finite difference equation solver which solves a difference equation including terms of regional speed, gradient speed, curvature speed and a speed based on contour shape.

15. The medical imaging apparatus as set forth in claim 13, where the fast marching method algorithm comprises:

flood filling a contour yielding a regional image;

obtaining an accepted set of contour points and distances in the narrow band from the regional image;

tagging a trial set and a far set of points defining a revised contour;

computing trial set distances from the accepted set; and computing far set distances from the accepted set.

16. The medical imaging apparatus as set forth in claim 15, where the obtaining an accepted set comprises:

checking a location of each pixel point in the image relative to a central pixel; and computing a fractional distance of each pixel point from the central pixel.

17. A method of determining a contour for pixel groups within a diagnostic image comprising:

sorting pixels in the image into a defined number of classes;

iteratively, fitting a curve to pixels of a like class within the image; and registering at least the curve and the image for display, the fitting a curve step including:

extracting a region of interest in the image;

computing a signed distance transform contour in a narrow band within the region of interest;

determining a rate at which the contour changes; and expanding the contour at the rate determined.

18. The method of determining a contour as set forth in claim 17, where the determining a rate step comprises:

solving the finite difference equation including terms of regional speed, gradient speed, curvature speed and, a speed based on organ shape.

19. A method of determining a contour comprising:

sorting pixels in a diagnostic image into a defined number of classes;

iteratively, fitting a contour to pixels of a like class within the diagnostic image;

flood filling the contour yielding a regional image;

obtaining an accepted set of contour points and distances in a narrow band;

tagging a trial set and a far set of points defining a revised contour;

computing trial set distances from an accepted set; and computing far set distances from the accepted set.

20. The method of determining a contour as set forth in claim 19 where the obtaining an accepted set comprises:

checking a sign of each pixel point in the image as immediately surrounding a central pixel;

computing a fractional distance of each pixel point from the central pixel.

21. An apparatus for segmenting medical images comprising:

a display on which a region of interest is displayed, the region of interest including at least one segment of pixels that have a defined similarity to each other;

a contour altering software routine which iteratively alters an input estimated contour to an output estimated contour, the contour altering software route calculating a speed at which the contour changes;

an initial estimate software routine which inputs an initial estimated contour of the at least one segment into the contour altering routine;

a final contour extracting software routine for iteratively inputting the output estimated contour into the contour altering software routine until a final contour which substantial circumscribes the at least one segment is extracted.

22. The apparatus as set forth in claim 21 wherein the contour altering routine includes:

a region speed software routine which calculates a rate at which the region changes;

a shape speed software routine which calculates a rate at which a shape of the contour is changing;

a gradient speed software routine which calculates a rate at which an edge of the contour is changing.

* * * * *